(12) United States Patent
Bahlmann

(10) Patent No.: US 6,195,689 B1
(45) Date of Patent: Feb. 27, 2001

(54) HEADEND PROVISIONING AGENT

(75) Inventor: Bruce F. Bahlmann, White Bear Lake, MN (US)

(73) Assignee: MediaOne Group, Inc., Englewood, CO (US)

( * ) Notice: Subject to any disclaimer, the term of this patent is extended or adjusted under 35 U.S.C. 154(b) by 0 days.

(21) Appl. No.: 09/305,680

(22) Filed: May 5, 1999

(51) Int. Cl.[7] .................................................. G06F 13/00
(52) U.S. Cl. ........................................................ 709/217
(58) Field of Search .................................. 709/200, 201, 709/203, 206, 207, 212, 213, 214, 216, 217, 218, 219, 220, 221; 379/201

(56) References Cited

U.S. PATENT DOCUMENTS

| | | | | |
|---|---|---|---|---|
| 4,897,866 | * | 1/1990 | Majmudar et al. | 379/93.14 |
| 5,414,809 | * | 5/1995 | Hogan et al. | 345/349 |
| 5,692,181 | * | 11/1997 | Anand et al. | 707/102 |
| 5,897,635 | * | 4/1999 | Torres et al. | 707/10 |
| 6,031,904 | * | 2/2000 | An et al. | 379/201 |
| 6,035,300 | * | 3/2000 | Cason et al. | 707/102 |

* cited by examiner

Primary Examiner—Moustafa M. Meky
(74) Attorney, Agent, or Firm—Brooks & Kushman P.C.

(57) ABSTRACT

An apparatus and method for controlling network provisioning servers. Users are provided with a common user interface that is independent of each provisioning server vendor's unique user interface. Tools are provided to allow the user to add, view, modify and delete parameters for network definitions, headend nodes, network policies, custom devices and static Internet Protocol addresses used by the provisioning servers. Tools are also provided to view, and modify top level network policy group definitions. The parameters are stored in a database. Locks are provided on the database as a whole, and for individual records within the database to prevent simultaneous changes by multiple users. Requested changes to the database are validated before being implemented. Reports can be generated from the information within the database. Access to various tool features is limited based upon a user level assigned to each user. A log file provides a history of all user initiated transactions.

36 Claims, 38 Drawing Sheets

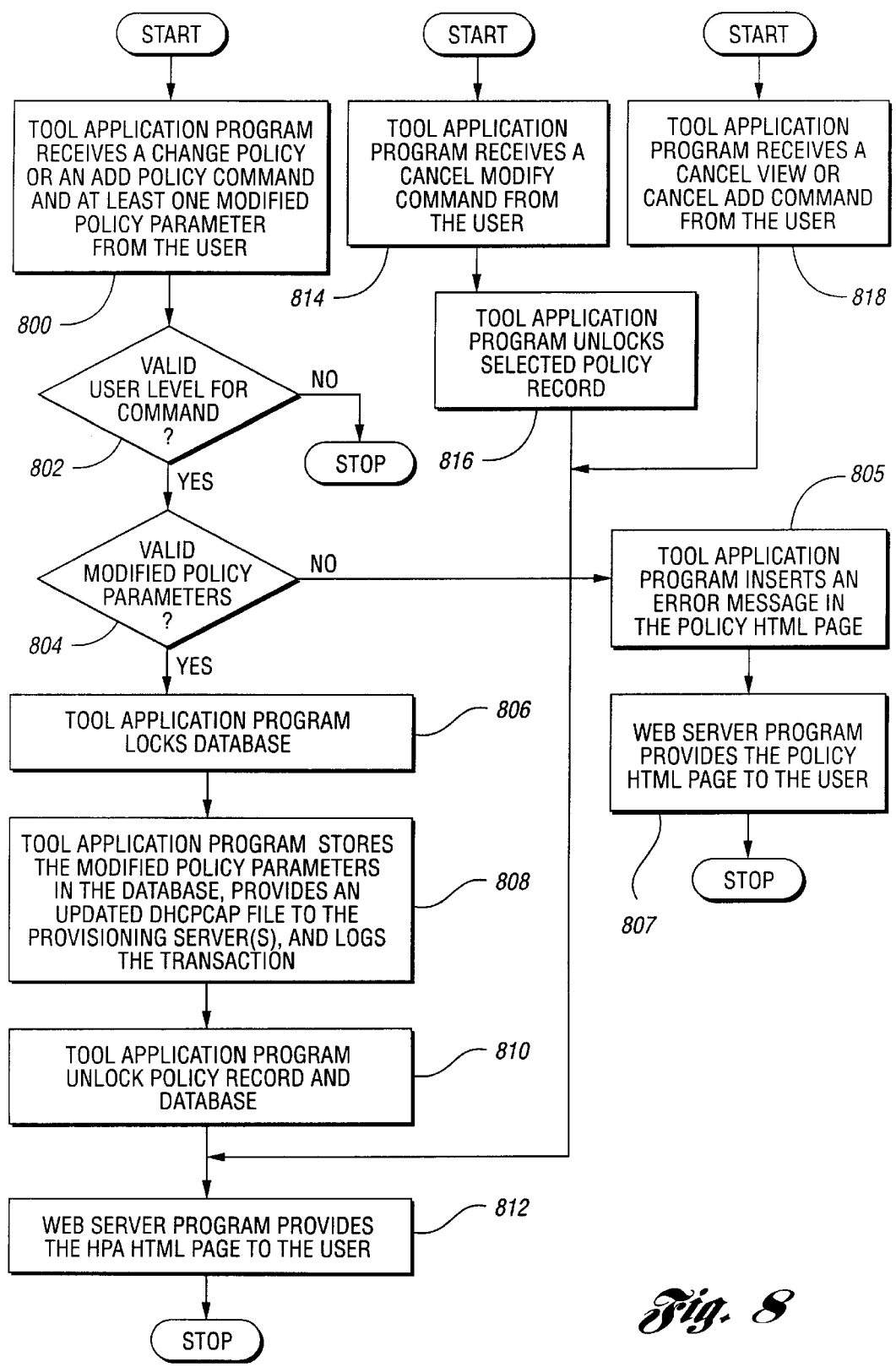

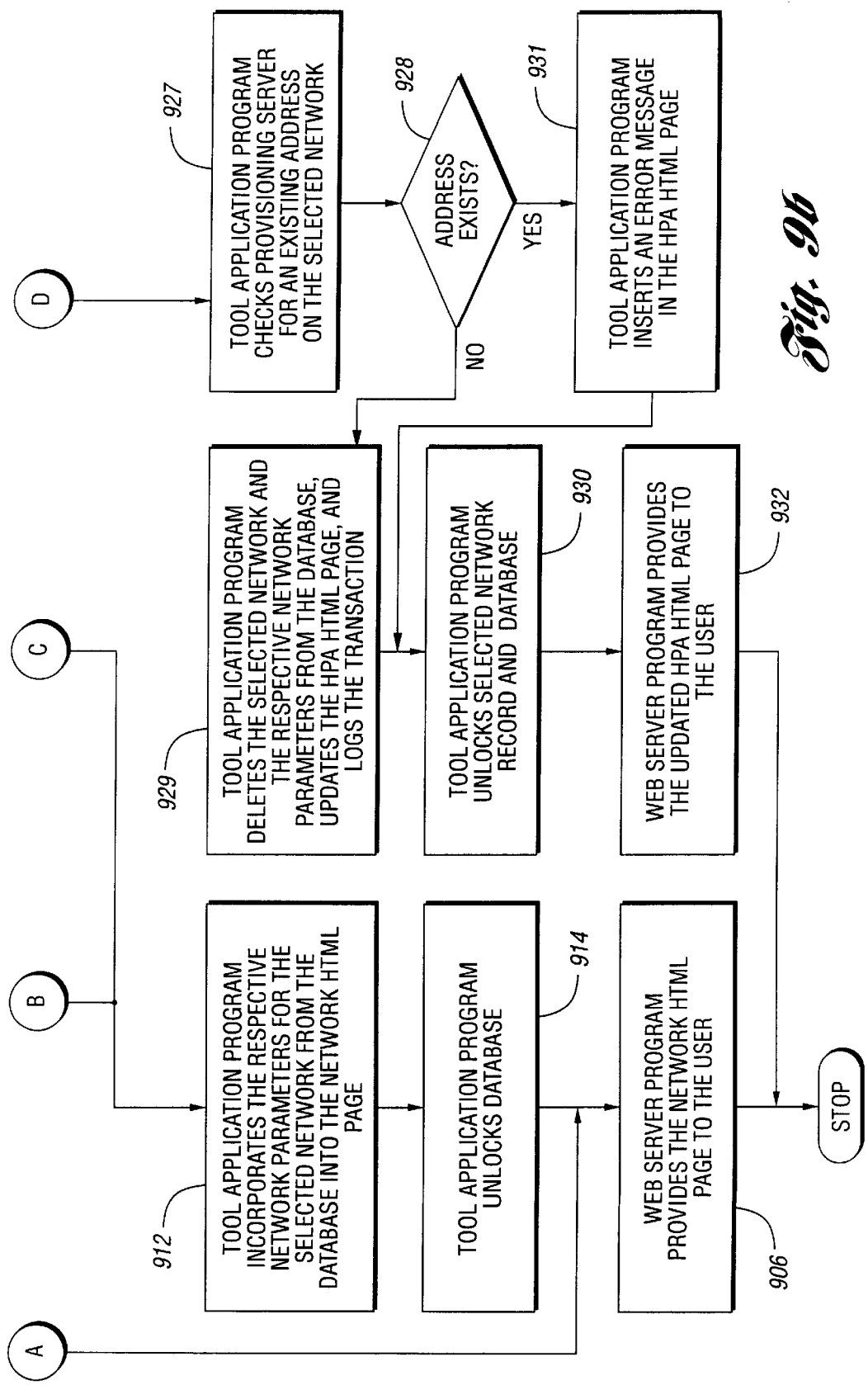

Network

Headend: Saint_Paul ▼  Use: Customer Network (RES) ▼  *1002*

Network: 209.32.162.0  Subnet Mask: 255.255.255.0[24_1_256] ▼

Gateway: 209.32.162.1  Gateway DNS Name: _____ (Optional)

Gateway[2]
Only!): _____  Gateway [2] DNS Name: _____ (For point-to-point links)

Location: _____

Remarks: _____

Use DHCP ☑ .... Use Dynamic DNS ☐ .... Network Policy: MN, Saint_Paul_2 ▼  *1004*

Primary Dynamic Range: 209.32.162.2  To  209.32.162.254

Secondary Network [1]: 10.32.162.0

Secondary Dynamic Range: 10.32.162.4  To  10.32.162.254

Secondary Network [2]: 10.132.162.0

Secondary Dynamic Range: 10.132.162.4  To  10.132.162.254  *1010*

Generate BOOTP Files (not required for DOCSIS) ☑ .......TFTP Directory:/Saint_Paul/209.32.162.0 (For auto-provisioning)

Service Group: Headend ▼  TxFq: 25 ▼  RxFq: 675 ▼  Loop Delay: 768 ▼  *1006*

Make Changes  Cancel
*1012*  *1014*

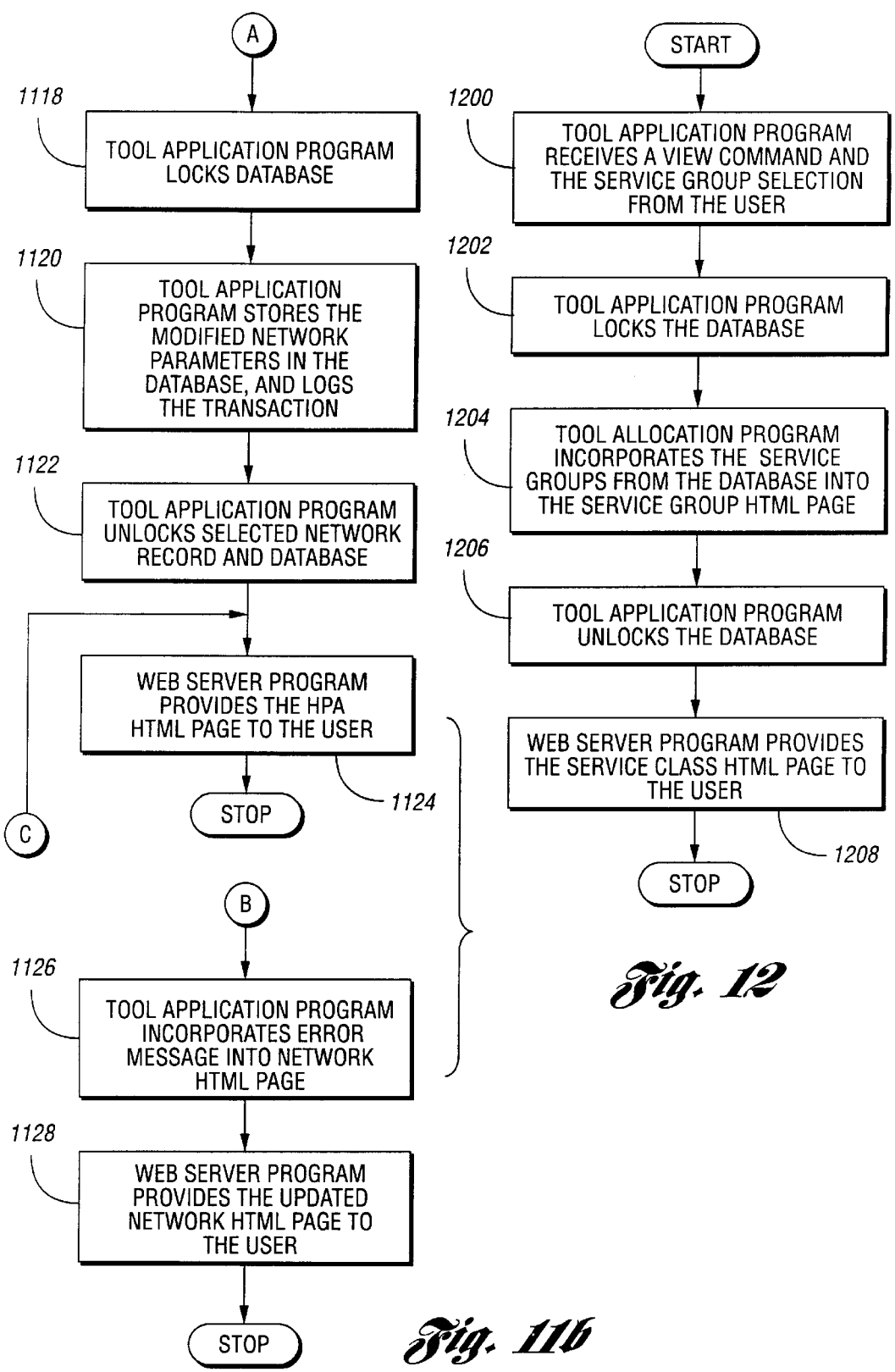

Service Group Editor ~1506

Service Name: [basiclt-5] (Spaces will be ignored)

DS Bandwidth: [1500] US Bandwidth: [300] Access Priority: [normal] Burst Traffic: [1518_bytes/1_pkt]

Headend Node: [No] Ethernet Nodes Supported: [5]

Modem File Type: [LANCity] Filters: [DHCP/IP] Network Access: [Yes]

Upgrade File Name: [              ] Optional (spaces will be ignored)

[Make Changes] [Cancel]
~1502  ~1504

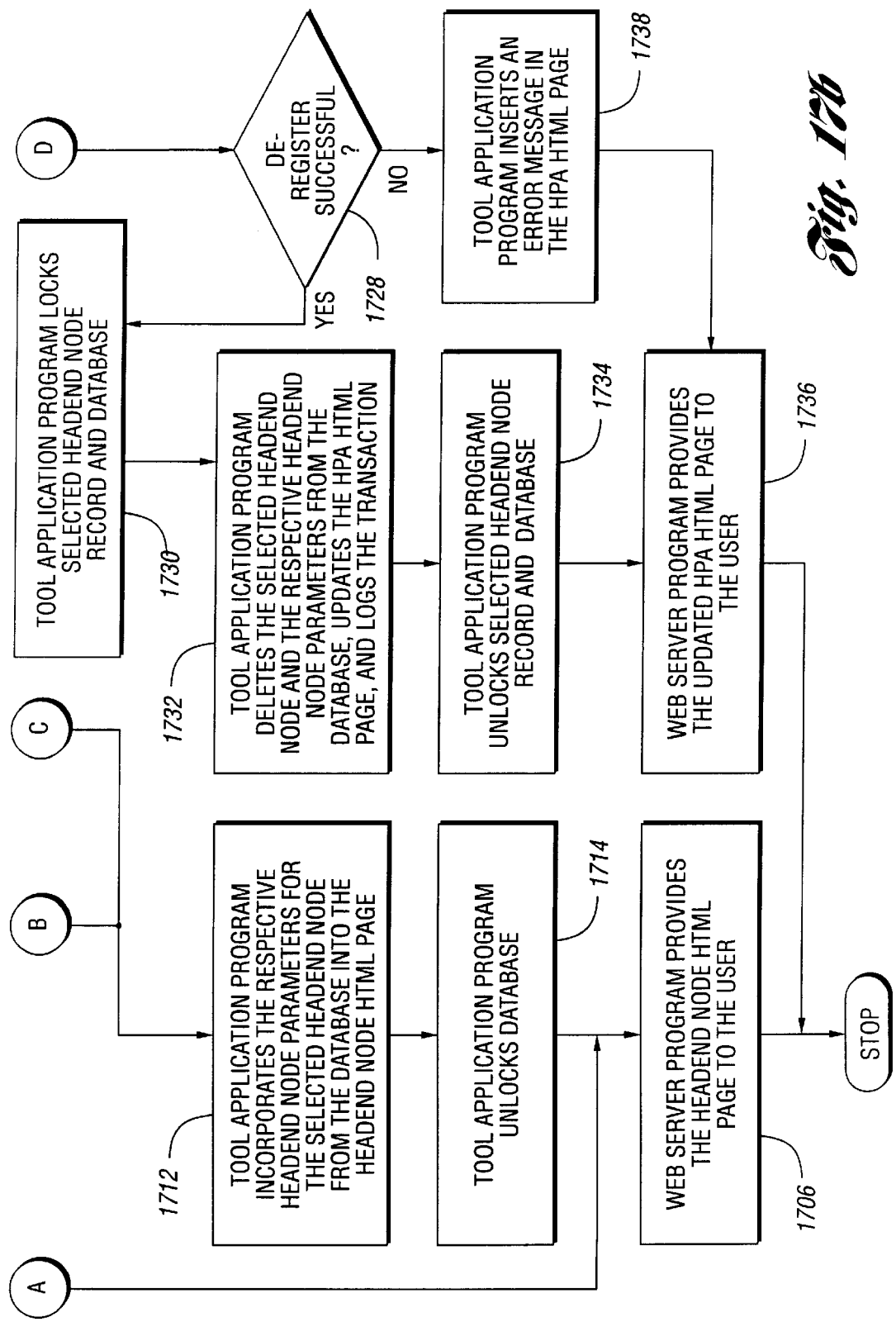

Headend Node:

City: [Saint_Paul ▼]  State: [MN ▼]  Headend: [Saint_Paul ▼]  Node: [1 ▼]

Mac Address: [0000ca040510]  IP Address: [10.32.162.3]  Service Group: [headend ▼]

Physical Location: [                    ]  i.e. Row, rack, slot (optional)

Generate DNS for Node: [✓] — 1802

DNS Name: [                    ]

[Make Changes] [Cancel] — 1806
     └ 1804

Selecting the [Make Changes] button will ensure the modem is provisioned and check that the data entered is correct.

Static Entry

City: [Saint_Paul ▼]    State: [MN ▼]    Headend: [Saint_Paul ▼]    Node: [1 ▼]

Static IP: [24.128.2.199]    Hardware Address: [0800208703ba]    (Required for hsdtools lookup)

Unique Name: [wldev01]

Remarks: [NE Dev Server (Web/Anonymous FTP) - Bruce]

Generate DNS [✓].....Domain: mn.mediaone.net
       └─ 2102

DNS Name: [nestage]    CName: [        ] (Optional)

[Make Changes]  [Cancel]
    └─ 2104    └─ 2106

The unique name should be the NIS or machine if PC or router name.
If Generate DNS is selected, DNS Names & CNAMES will be checked internally to ensure they are unique,
Neither should include the domain.

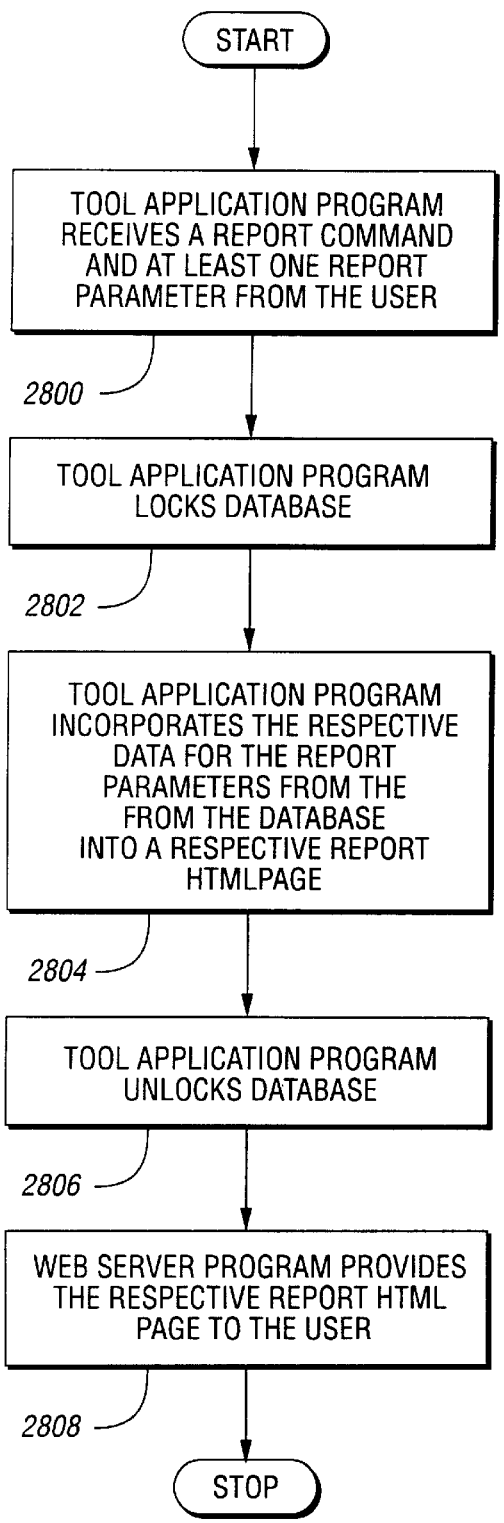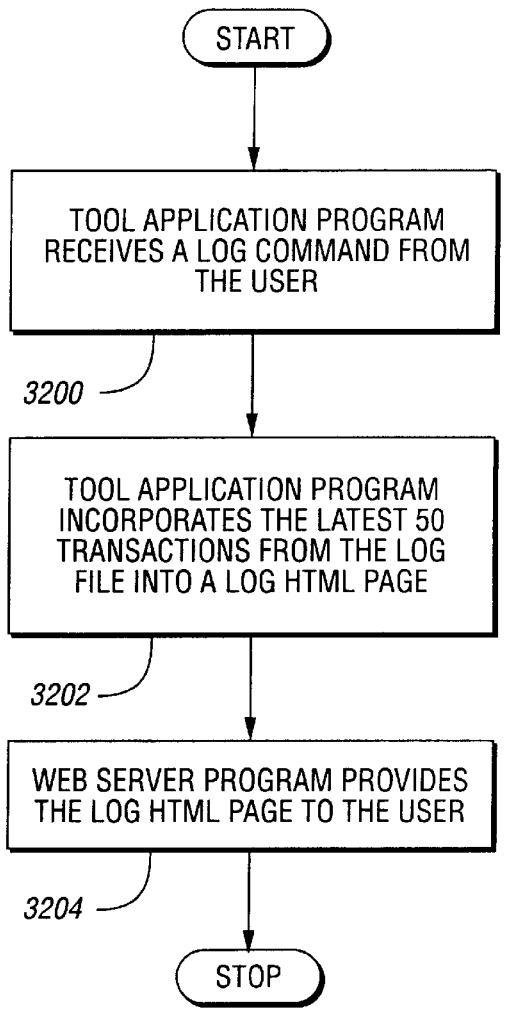
Fig. 28
Fig. 32

IP Address Summary Report

| Network: | Broadcast: | Subnet Mask/Bits: | Use: | Hosts: | Location: |
|---|---|---|---|---|---|
| 10.32.162.0 | 10.32.162.255 | 255.255.255.0/24 | Customer Network (Res) | 256 | |
| 10.132.162.0 | 10.132.162.255 | 255.255.255.0/24 | Customer Network (Res) | 256 | |
| 10.218.2.0 | 10.218.3.255 | 255.255.254.0/23 | Customer Network (Res) | 512 | |
| 10.18.2.0 | 10.18.3.255 | 255.255.254.0/23 | Customer Network (Res) | 512 | |
| 10.32.163.0 | 10.32.163.255 | 255.255.255.0/24 | Customer Network (Res) | 256 | |
| 10.132.163.0 | 10.132.163.255 | 255.255.255.0/24 | Customer Network (Res) | 256 | |
| 10.32.164.0 | 10.32.167.255 | 255.255.252.0/22 | Customer Network (Res) | 1024 | |
| 10.32.161.0 | 10.32.161.31 | 255.255.255.224/27 | Customer Network (Res) | 32 | IGH HUB 101.08 |
| 10.132.161.0 | 10.132.161.31 | 255.255.255.224/27 | Customer Network (Res) | 32 | IGH HUB 101.08 |
| 209.32.162.0 | 209.32.162.255 | 255.255.255.0/24 | Customer Network (Res) | 256 | |
| 24.218.2.0 | 24.218.3.255 | 255.255.254.0/23 | Customer Network (Res) | 512 | |
| 209.32.163.0 | 209.32.163.255 | 255.255.255.0/24 | Customer Network (Res) | 256 | |
| 209.32.164.0 | 209.32.167.255 | 255.255.252.0/22 | Customer Network (Res) | 1024 | |
| 209.32.161.0 | 209.32.161.31 | 255.255.255.224/27 | Customer Network (Res) | 32 | IGH HUB 101.08 | hpa version: 3.17

Fig. 29

IP Address Summary for Headend: Saint_Paul

[Cancel]

| Net | 10.32.163.0 | 10.32.163.255 | 256 Hosts | 255.255.255.0/24 | 1 Class C |
|---|---|---|---|---|---|
| IP | Use: | Type: | Node: | Desc./Bootfile: | Mac: | Name: |
| 10.32.163.0 | Network | | | | | |
| 10.32.163.1 | Gateway | | | | | |
| 10.32.163.2 | Free | | | | | |
| 10.32.163.3 | Saint_Paul | node | 1 | Headend | 000ca05f92c | |
| 10.32.163.4 | DYNAMIC RANGE | 10.32.163.254 | | | | |
| 10.32.163.255 | Broadcast | | | | | |

| Net | 209.32.162.0 | 209.32.162.255 | 256 Hosts | 255.255.255.0/24 | 1 Class C |
|---|---|---|---|---|---|
| IP | Use: | Type: | Node: | Desc./Bootfile: | Mac: | Name: |
| 209.32.162.0 | Network | | | | | |
| 209.32.162.1 | Gateway | | | | | |
| 209.32.162.2 | DYNAMIC RANGE | 209.32.162.254 | | | | |
| 209.32.162.255 | Broadcast | | | | | |

| 209.32.164.97 | Free | | | | | |
| 209.32.164.98 | Free | | | | | |
| 209.32.164.99 | Free | | | | | |
| 209.32.164.100 | DYNAMIC RANGE | 209.32.164.254 | | | | |
| 209.32.164.255 | Free | | | | | |

[Cancel]

*Fig. 30*

IP Address Report for Network: 209.32.162.0

| Network: | 209.32.162.0 | Broadcast: | 209.32.162.255 |
|---|---|---|---|
| Gateway: | 209.32.162.1 | Subnetmask/bits: | 255.255.255.0/24 |
| Size: | 1 Class C | Hosts: | 256 |
| Location: | | Use: | Customer Network (Res) |
| Remarks: | | | |

| IP | Use: | Type: | Node: | Desc./Bootfile: | Mac: | Name: |
|---|---|---|---|---|---|---|
| 209.32.162.0 | Network | | | | | |
| 209.32.162.1 | Gateway | | | | | |
| 209.32.162.2 | Dynamic Range | 209.32.162.254 | | | | |
| 209.32.162.255 | Broadcast: | | | | | | hpa version: 3.17

[Cancel]

```
The following is the last 50 transactions of the Web HPA

Thu Mar 18 11:32:00 1999:HPA_USERbahlmannModified: network
FROM: 169.152.48.122 and WEB_ACCOUNT:
Changed DATA from: [913136362|headend|Saint_Paul|MN|Saint_Paul|1|||||mn.mediaone.net|209.32.160.11|209.32.160.10||
0.0.0.0|14400|21600|||||||86400|||||||
TO___: network|||Roseville|||||777701|1|111107|2|2|26.75|543|512|||24.218.2.0|||/Roseville/24.218.2.0||24.218.2.1|
255.255.254.0|24.218.2.11|10.218.2.11|10.218.3.254|10.18.2.0|||||

Fri Mar 19 08:17:56 1999:HPA_USERbahlmannModified: network
FROM: 169.152.48.122 and WEB_ACCOUNT:
Changed DATA from: [913136362|headend|Saint_Paul|MN|Saint_Paul|1|||||mn.mediaone.net|209.32.160.11|209.32.160.10||
0.0.0.0|14400|21600|||||||86400|||||||
TO___: network|||Saint_Paul|||777701|1|111107|2|1|25|675|768|||209.32.162.0|918765200|/Saint_Paul/209.32.162.0|209.32.162.1|
255.255.255.0|209.32.162.2|209.32.162.254|10.132.162.4|10.132.162.254|||10.32.162.4|10.32.162.254|

Fri Mar 19 08:17:56 1999:HPA_USERbahlmannModified: network
FROM: 169.152.48.122 and WEB_ACCOUNT:
Changed DATA from: [913136362|headend|Saint_Paul|MN|Saint_Paul|1|||||mn.mediaone.net|209.32.160.11|209.32.160.10||
0.0.0.0|14400|21600|||||||86400|||||||
TO___: network|||Saint_Paul|||777701|1|111107|2|1|30|707|512|||209.32.163.0|913136362|/Saint_Paul/209.32.163.0|
209.32.163.1|255.255.255.0|209.32.163.2|209.32.163.254|10.132.163.4|10.132.163.254|||10.132.163.4|
10.32.163.254|10.132.163.0|||||

Fri Mar 19 08:17:56 1999:HPA_USERbahlmannModified: network
FROM: 169.152.48.122 and WEB_ACCOUNT:
Changed DATA from: [913136362|headend|Saint_Paul|MN|Saint_Paul|1|||||mn.mediaone.net|209.32.160.11|209.32.160.10||
0.0.0.0|14400|21600|||||||86400|||||||
TO___: network|||Saint_Paul|||777701|2|111107|2|1|||512|||209.32.164.0|918765200|/Saint_Paul/209.32.164.0|
209.32.167.254|255.255.255.252|10.32.164.100|209.32.164.254|10.32.164.0|||||10.32.164.100|10.32.164.254||||

Fri Mar 19 08:17:56 1999:HPA_USERbahlmannModified: network
FROM: 169.152.48.122 and WEB_ACCOUNT:
Changed DATA from: [913136362|headend|Saint_Paul|MN|Saint_Paul|1|||||mn.mediaone.net|209.32.160.11|209.32.160.10||
0.0.0.0|14400|21600|||||||86400|||||||
TO___: network|||Saint_Paul|||777701|1|111107|2|1|25|675|768|||209.32.162.0|918765200|/Saint_Paul/209.32.162.0|
209.32.162.1|255.255.255.0|209.32.162.2|209.32.162.254|10.132.162.4|10.132.162.254|||10.32.162.4|
10.132.162.254|10.132.162.0|
```

[Cancel]

Fig. 33

HEADEND PROVISIONING AGENT

TECHNICAL FIELD

The present invention relates to the field of web-based apparatus and methods for controlling provisioning servers.

BACKGROUND ART

The day-to-day responsibility for maintaining and updating Dynamic Host Configuration Protocol (DHCP) and Bootstrap Protocol (BOOTP) provisioning servers can be labor intensive for a Multiple Subscriber Organization (MSO) service provider. Each provisioning server vendor provides a proprietary graphical user interface (GUI) and a unique database to allow the MSO personnel to control operations. A user may navigate through fifteen vendor GUI windows to set the necessary configurations on one provisioning server. Since having several provisioning servers from different vendors is common for the MSO service provider, the user must learn each vendor's GUI interface.

Furthermore, the settings entered into each vendor's GUI are stored locally on that vendor's provisioning server. This requires the MSO personnel to maintain each independent database in agreement with the every other database stored on the various provisioning servers manually. Database entries include primary and secondary network definitions, sub-network definitions, Domain Name System (DNS) configurations, Internet Protocol (IP) address management, Trivial File Transfer Protocol (TFTP) server configuration, Message-Digest Algorithm 5 (MD5—a type of boot file) file building, network policy management, Data Over Cable Service Interface Specification (DOCSIS) and legacy cable modem support, and support for various levels of service.

MSO service providers want a mechanism for distributed provisioning server management accessible to users at different levels of authorization, and at different physical locations. This mechanism includes a common user interface to streamline training and daily operations, and a central database that allows for automated checking and validation of additions, modifications and deletions, as well as report generation.

DISCLOSURE OF INVENTION

The present invention is an apparatus and method for controlling network provisioning servers. Users are provided with a common user interface that is independent of each provisioning server vendor's unique graphical user interface. The common user interface makes present invention easy to learn and use. Tools are provided to allow the user to add, view, modify and delete parameters from network definitions, headend nodes, network policies, custom devices and static Internet Protocol addresses used by the provisioning servers. Tools are also provided to view, and modify top level network policy group definitions. The parameters are stored in records within a database. Locks are provided on the database as a whole, and for the individual records to prevent simultaneous changes by multiple users. Requested changes to the database are validated before being implemented. Reports can be generated from the information within the database. Access to various tool features is limited based upon a user level assigned to each authorized user. A log file provides a history of all user initiated transactions.

The present invention includes a web server program that allows the users access from anywhere on the networks. A configuration file is provided to adapt to any unique characteristics of the hosting computer. Customized Application Program Interface code provides communications with provisioning servers from different vendors.

Accordingly, it is an object of the present invention to provide an apparatus and a method that provides a common user interface to a provisioning system having one or more provisioning servers. The present invention includes a tool application program that allows the user to add, view, modify and delete policies from the provisioning system.

Another object is to provide a central database for storing the records provided by the user. This central database allows for automated checking and validation of the records, and provides a source of information for report generation.

Another object is to provide a server program that provides a standard set of protocols to facilitate communications with users anywhere on the networks.

Yet another object of the present invention is to provide the user with an interface to add, view, modify and delete headend nodes, network definitions, custom devices, and static Internet Protocol addresses from the provisioning system.

These and other objects, features and advantages will be readily apparent upon consideration of the following detailed description in conjunction with the accompanying drawings.

BRIEF DESCRIPTION OF DRAWINGS

FIG. 8 is a flow diagram of a process for changing network policy parameters;

FIG. 9a–9b is a flow diagram of a process for adding, viewing, modifying and deleting a network;

FIG. 10 is an example of a network page display;

FIG. 11a–11b is a flow diagram of a process for changing network parameters;

FIG. 12 is a flow diagram of a process for displaying the available service groups;

FIG. 15 is an example of a service group editor page display;

FIG. 17a–17b is a flow diagram of a process for adding, viewing, modifying and deleting a headend node;

FIG. 18 is an example of a headend node page display;

FIG. 21 is an example of a static IP address page display;

FIG. 28 is a flow diagram of a process for generating a report;

FIG. 29 is an example of an IP address summary report;

FIG. 30 is an example of an IP address report for a selected headend;

FIG. 31 is an example of an IP address report for a selected network;

FIG. 32 is a flow diagram of a function to generate a log report; and

FIG. 33 is an example of the log report.

BEST MODE FOR CARRYING OUT THE INVENTION

An Internet Architecture Board (IAB) defines the Internet standards used below in Standard protocols (STD) and Request For Comments (RFC) documents.

Figure 1:
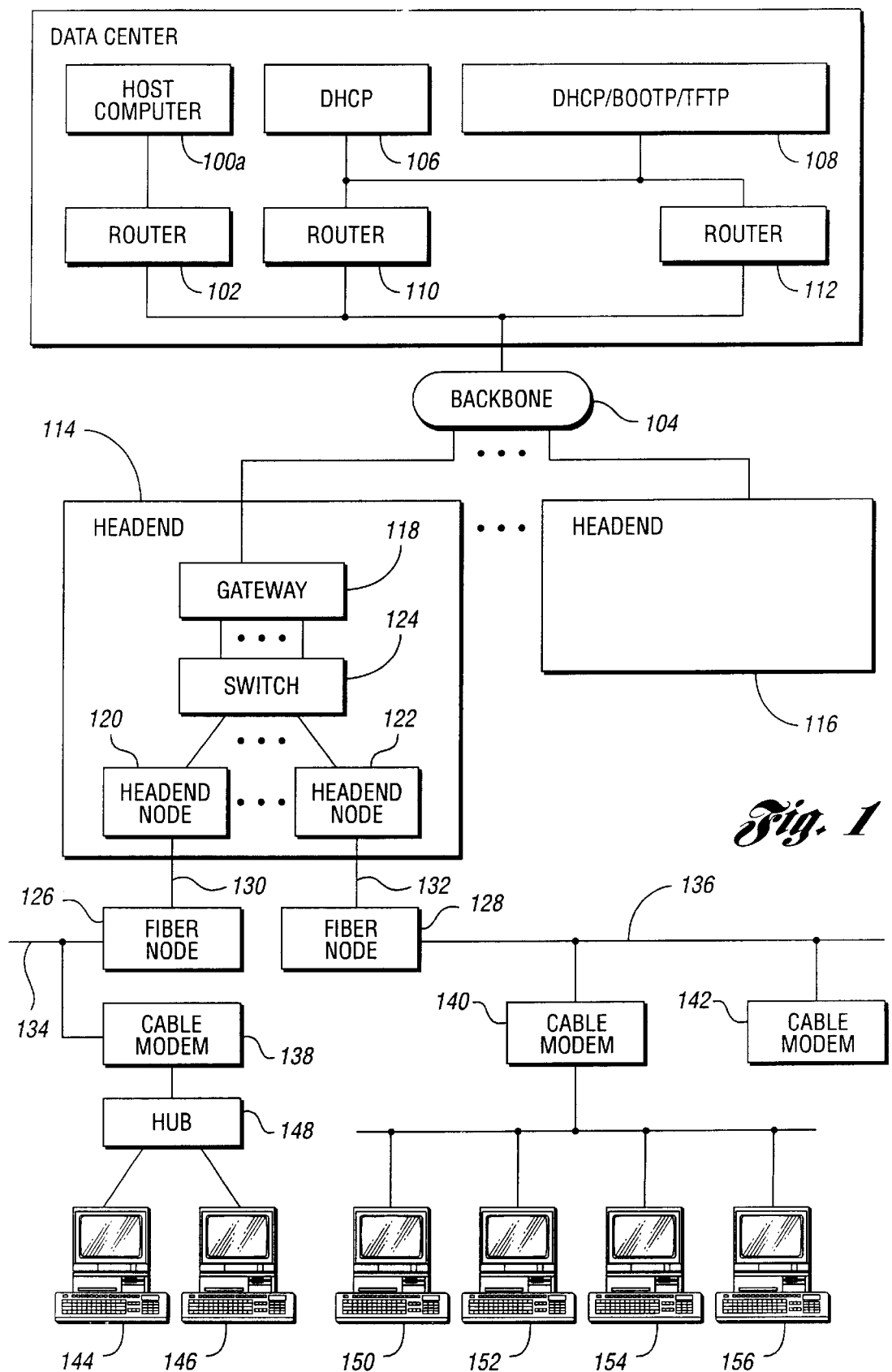
FIG. 1 is a hardware block diagram of the present invention connected to a typical network.

FIG. 1 is a hardware block diagram of the present invention connected to a typical network. The Headend Provisioning Agent (HPA) tool hardware, a host computer 100a, is connected through a router 102 to the backbone network 104. A variety of servers, including a Dynamic Host Configuration Protocol (DHCP)(IAB draft standard protocol RFC 2132) server 106, and a combination DHCP/Bootstrap Protocol (BOOTP)(IAB draft standard protocol RFC 2131)/Trivial File Transfer Protocol (TFTP)(IAB standard protocol STD 33) server 108 are also connected to the backbone network 104 through redundant routers 110 and 112. Many other server types, not shown, may be found on the backbone network 104, for example, Domain Name System servers, communication servers, fire wall servers, data servers, directory servers, and the like.

Backbone network 104 may be connected to other networks, network segments, and sub-networks. Two example connections are shown in FIG. 1, to headends 114 and 116. Within headend 114 is a gateway 118 that connects to multiple headend nodes 120–122 through a switch 124. Each headend node 120–122 connects to fiber nodes 126–128 through fiber optic cables 130–132 respectively. Fiber nodes 126–128 bridge the fiber optic cables 130–132 to the coaxial cables 134–136. The coaxial cables tap into the customer's homes (not shown) to cable modems 138–142. Cable modem 138 connects to two customers personal computers (PC) 144 and 146 through a hub 148. Cable modem 140 is connected directly to four PC's 150–156. Headend 116 connects to other headend nodes, fiber nodes, cable modems and PC's (not shown) in another part of the city, or in another city altogether.

Many other variations of the network configuration are possible. The present invention may be presented with many different wide area networks, local area networks, fiber optic networks, fibre channel networks, dozens of different servers, routers, switchers, bridging circuits, modems, cable modems, and network interface cards. The preferred embodiment of the present invention deals with the variations by using the TCP/IP (IAB standard protocols 7 and 5) standards for communication. Where the HPA tool is used in other types of networks, other communications standards could be used to accommodate the network devices.

Figure 2:
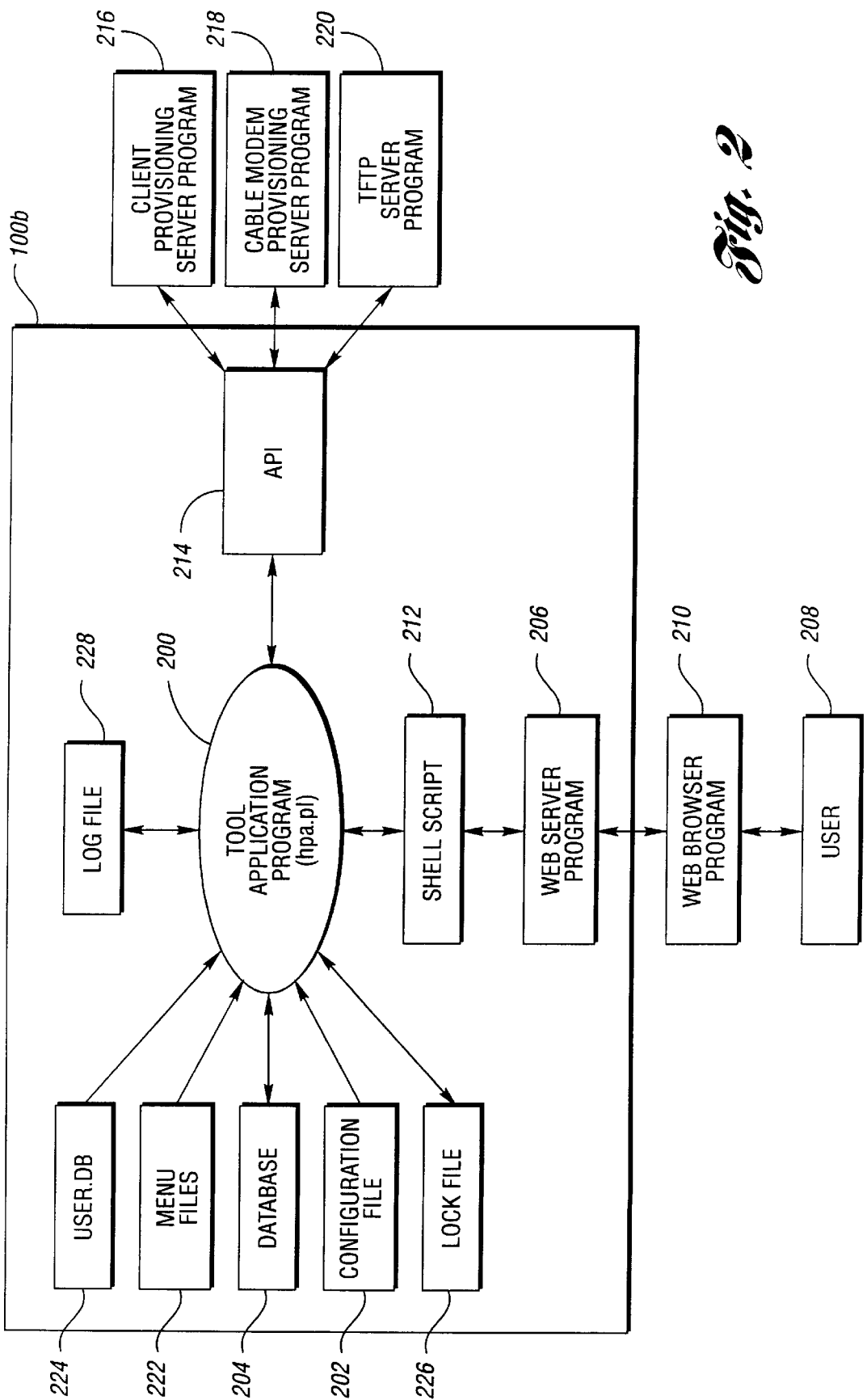
FIG. 2 is a software block diagram of the present invention communicating with other programs.

FIG. 2 is a software block diagram of the present invention communicating with other applications. HPA tool software application programs 100b executing on the host computer 100a are built around a tool application program 200. Tool application program 200 is a Common Gateway Interface (CGI) script that executes, parses, and generates dynamic hypertext markup language (HTML)(IAB proposed standard protocol RFC 1866) information back to the user. This piece of code is independent of the operating system but dependent upon the configuration dependent entries in a configuration file 202 to operate properly.

The tool application program 200 stores information in a database 204. Pertinent information for display pages is loaded into hidden HTML properties (variables) and passed between the various tool options used by the HTML page. If any of the information is updated, the properties are also updated. These hidden properties also allow for sharing of the information with other tools that may require the same data. Web server program 206 facilitates communications between the tool application program 200 and the user 208 via the user's web browser program 210. Shell script 212 translates the interfaces between the tool application program 200 and web server program 206 to accommodate web server programs 206 from different vendors. Application Program Interface (API) 214 translates message and interface formats between the tool application program 200 and servers programs 216–220. Client provisioning server program 216 is a DHCP server program used to provisioning the subscribers. Cable modem provisioning server 218 is a BOOTP or DHCP/BOOTP server program used to provision the cable modems and headend nodes.

Menu file 222 stores data commonly required by the user 208. Tool application program 200 incorporates the data into menus embedded within the HTML pages. This approach eliminates the need for user 208 to memorize, or carry a reference book containing the network topology, hardware settings available, and other parameters. Menu file 222 contains listings of states, cities, headends, headend node numbers, radio frequencies that the cable modems use to transmit and receive, loop delay settings, network use categories, service groups, which include upstream data bandwidth and downstream data bandwidth and access priority and burst traffic service available to the customer, the number of Ethernet nodes supported by cable modems, cable modem types, and cable modem filter parameters.

The user.db file 224 provides a listing of users 208 authorized to use the tool application program 200, their respective passwords, and a respective user level. The user level provides multi-level access to all of the functions provided in the present invention. Users 208 having the first user level may only view information. The first user level provides access to interested parties who only require to look, but not change anything. At the second user level, a user 208 has all of the authority of the first user level plus the ability to modify headend node parameters. Headend technicians are assigned to the second user level. The third user level has all of the accessibility of the second user level plus an ability to modify custom device parameters. Senior installers are assigned to the third user level. Broadband engineers require all of the abilities of Senior installers plus the ability to add headend nodes and change IP addresses on the headend nodes—the fourth user level. Network engineers at the fifth user level may modify headend groupings and have access to all of the functions available at the lower user levels. Administrators at the sixth user level have access to all functions, including deleting, and excluding the ability to modify service groups. Only users 208 at user level seven may modify service groups.

All of the information stored in database 204 is divided into records. To avoid corruption of the database 204 by simultaneous modifications, a master lock is provided for the entire database 204 and record locks are provided for each record. A record lock is executed when a service group, network policy, headend node, network, custom device or static IP address is selected for the purposes of modification. Each record lock consists of creating a lock file 226 for that record associating the user 208 and time. A record lock is maintained until one of the following: the record is modified and the database 204 is successfully updated; the record is not modified and the user 208 cancels the modify function; or a 10 minute time limit expires. The master lock protects the database 204 by only allowing one update to happen at a time. If multiple overlapping update requests occur, then each update request must wait for a turn to lock the database 204, perform the update, and unlock the database 204. Since updates are not frequent with data of this nature, this form of file locking is adequate.

Database 204 is a pipe delimited flat file, although other types of databases could be used in the present invention. The flat file provides simplicity, speed for access, and queries from the tool application program 200. Tool application program 200 assigns a unique key to each record and checks each record before it is allowed to enter the database 204. The keys are used to reference the record in future operations and they are used during record locking operations. Hand entry of the records is therefore not advised since the checking and keying operations are skipped.

During additions and modifications to the database 204, a communication path is opened between the tool application program 200 and the provisioning server programs 216 and 218 through API 214. These communications consist of a sequence of commands that register/de-register medium access control (MAC) addresses and updates to information that describe how the provisioning server programs 216 and 218 should interact with the subscribers on the networks. For example, the DHCP/BOOTP provisioning server supplied by Join System, Inc. uses a command called "jdbreg" to add and delete MAC addresses from an internal registration database, and a configuration file called "dhcpcap" to configure how the server interacts with the subscribers on the networks. (The dhcpcap file syntax is identical to the standard bootptab file used by most BOOTP servers.) Scripts in the API 214 take the MAC addresses as arguments and submit them in jdbreg commands and dhcpcap files to the DHCP/BOOTP provisioning server. Communications with provisioning server programs from other vendors require different scripts in the API 214 to generate the appropriate commands and/or files. For the remainder of this document, the communications with the provisioning server programs 216 and 218 will use the terminology from the Join System, Inc. DHCP/BOOTP provisioning server example.

The scripts also confirm each action within the provisioning server programs 216 and 218 returning information about the success or failure of the action. For example, where the requested action is to delete a registered MAC address, the script first checks if the MAC address is registered. The script will then try to de-register the MAC address and verify that it was de-registered. An error message is sent to the user 208 if the requested action was not successful. Once the MAC address has been submitted to the provisioning server programs 216 and 218, a check is made to ensure that the updated dhcpcap file also copied to the provisioning server programs 216 and 218 is intact before it replaces the working dhcpcap file. This checking consists of copying two files to the provisioning server programs 216 and 218, then comparing the two copies. The working dchpcap file is replaced by the updated dhcpcap file only if both copies are identical.

Tool application program 200 also sends a headend node DNS file (henodes.dns) to provisioning server programs 216 and 218. Having DNS entries for headend nodes is useful during installations and troubleshooting. Since headend nodes do not have a leased IP address, they cannot obtain a DNS entry by convention procedures, and manual entry is not feasible. The tool application program 200 generates a host name and a canonical (alias) name for each headend node based on the IP address. For example, the entries:

| MA-Netwon-4 | IN | CNAME | nd-hrn-newton4 |
| nd-hrn-newton4 | IN | A | 24.128.36.11 | in the headend node DNS file creates a canonical name of MA-Netwton-4 that is an alias for headend reference node 4 at Newton having the IP address of 24.128.36.11.

The HPA tool software application programs 100b may be configured to several different server configurations. Possible configurations include a single host hardware executing a DHCP server software program (this configuration is not shown). Another configuration has a single host hardware executing a DHCP server software program with multiple dynamic IP address ranges using subnet groups (this configuration is not shown). Still another configuration has one host hardware (DHCP server 106) executing a DHCP server software program (Client provisioning server program 216) for servicing the clients, and a second host hardware (DHCP/BOOTP/TFTP server 108) executing a DHCP/BOOTP server software program (Cable modem provisioning server 218) for servicing the cable modems and headend nodes. Another configuration has one host hardware (DHCP server 106) executing a DHCP server software program (Client provisioning server program 216) for servicing the clients, and a second host hardware (DHCP/BOOTP/TFTP server 108) executing a DHCP/BOOTP server software program (Cable modem provisioning server 218) for servicing the cable modems and headend nodes and auto-provisioning. Yet another configuration (not shown) has distributed primary DHCP servers (hardware and software) located at each headend, with one or more secondary DHCP serves (hardware and software) centrally located and providing a backup capability should any of the primary DHCP servers become non-operational. Many other configurations are possible within the scope of the present invention. All of the above configurations are able to support a TFTP server software program 220 executed on a stand-alone host hardware, or co-hosted with one of the other server programs (e.g., DHCP/BOOTP/TFTP 108 in FIG. 1). Where one DHCP server software program is configured with multiple dynamic IP address ranges, the tool application program 200 performs subnet grouping automatically. A primary network is reserved for servicing the client PCs, a first secondary network is reserved for servicing cable modems and headend nodes, and a second secondary network is optionally reserved for auto-provisioning services.

Figure 3:
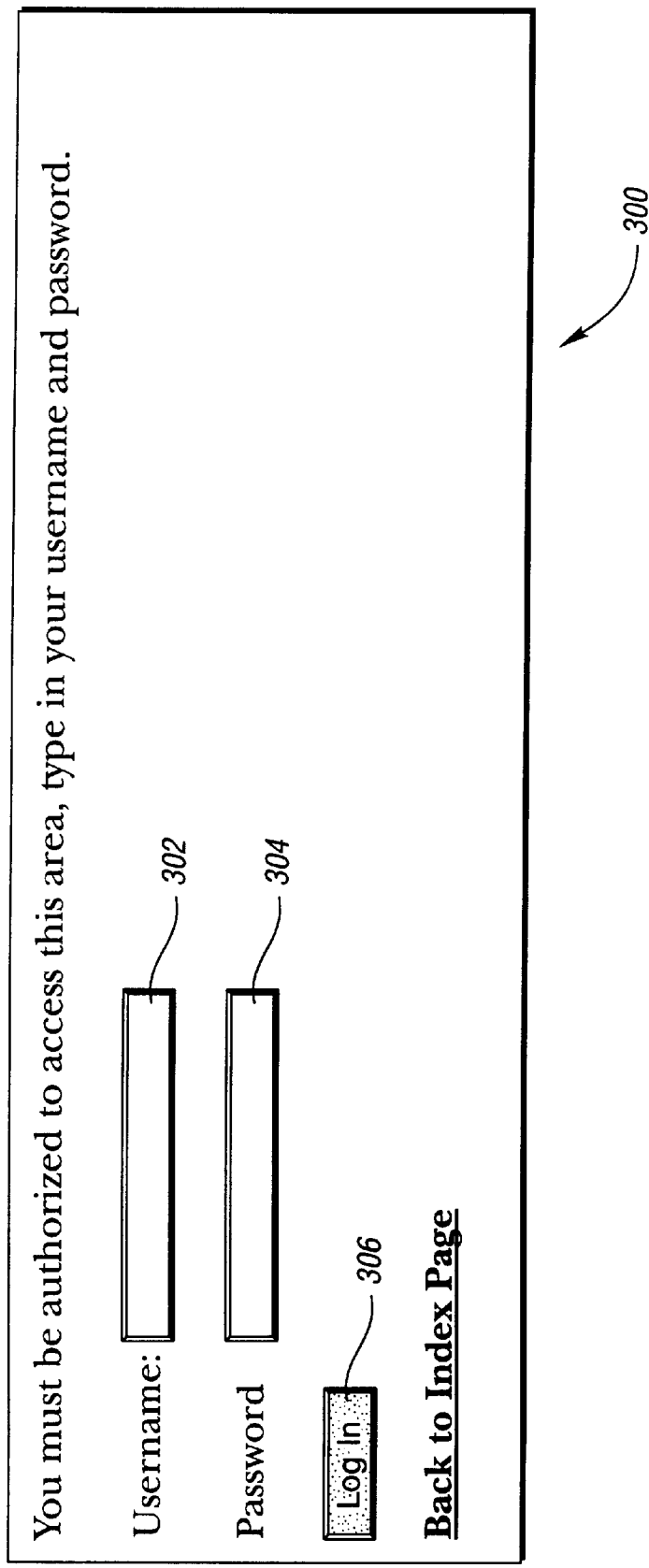
FIG. 3 is an example of a log in page display.

FIG. 3 is an example of a log in HTML page 300 provided to the user 208 starting to use the present invention. User 208 logs in by entering his user name 302, password 304, and then selecting the Log In entry 306.

Figure 4:
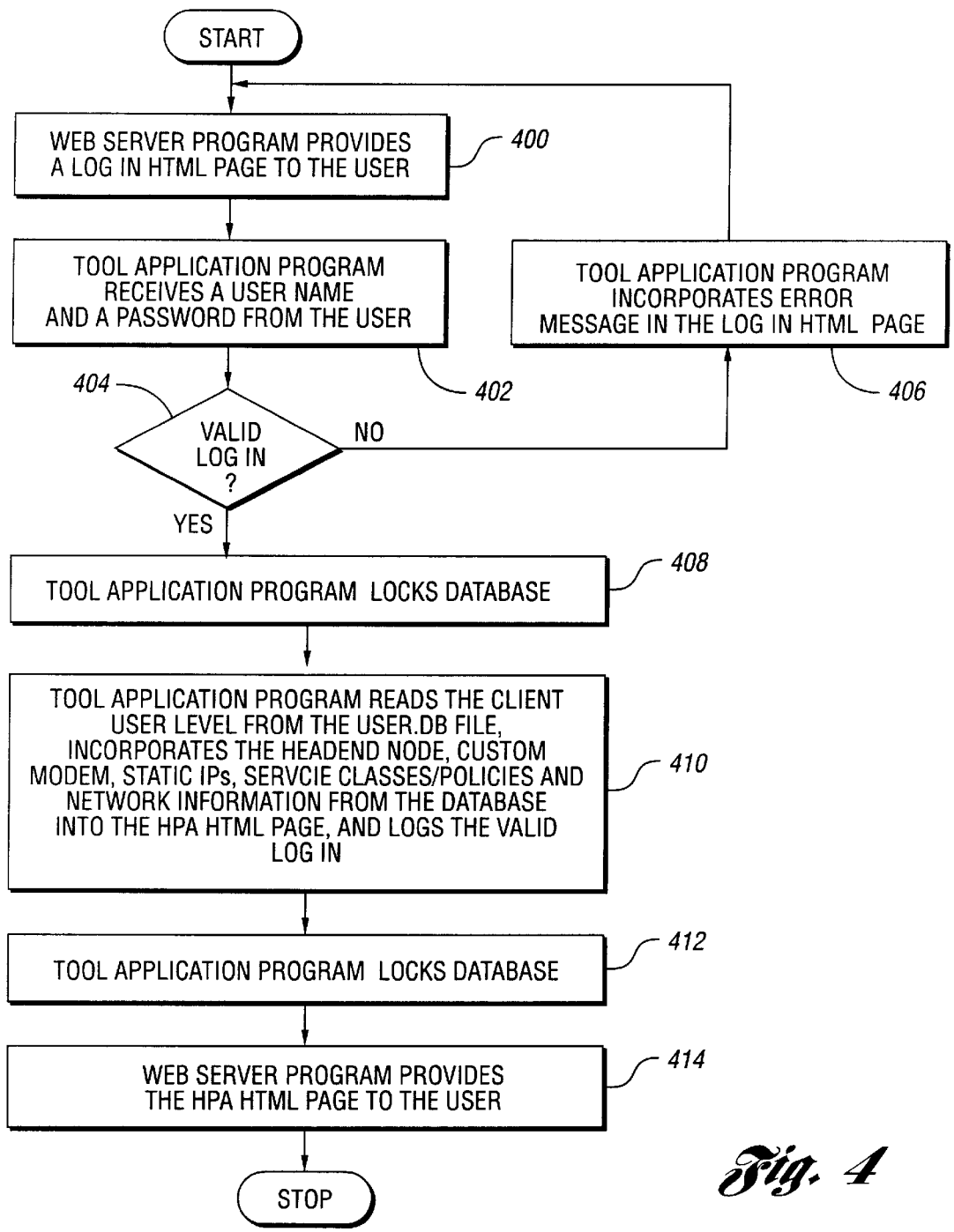
FIG. 4 is a flow diagram of a log in validation process.

FIG. 4 is a flow diagram that accompanies the log in HTML page 300. The process starts with the web server program 206 providing the log in HTML page 300 to the user 208, as shown in block 400. Next, in block 402, the application program 200 receives the user name 302 and password 304 from user 208. Decision block 404 compares the user name 302 and password 304 against the entries in user.db file 224. Where no match is found, tool application program 200 adds the message "Error Encountered: Loging Failed!" to the log in HTML page 300 as shown in block 406. When a match is found in the user.db file 224, tool application program 200 locks database 204, as shown in block 408. Tool application program 200 locks database 204 any time it is performing a read or write to the database 204. Next, tool application program 200 reads the respective user level from the user.db file 224, incorporates the headend node, custom modem, static IPs, service groups/policies and network information from database 204 into a top level display page, and places a valid log in entry in the log file 228, also shown in block 410. When tool application 200 is finished reading from the database 204, it unlocks database 204, as shown in block 412. Finally, web server program 206 provides the top level display page to the user 208, as shown in block 414.

Figure 5:
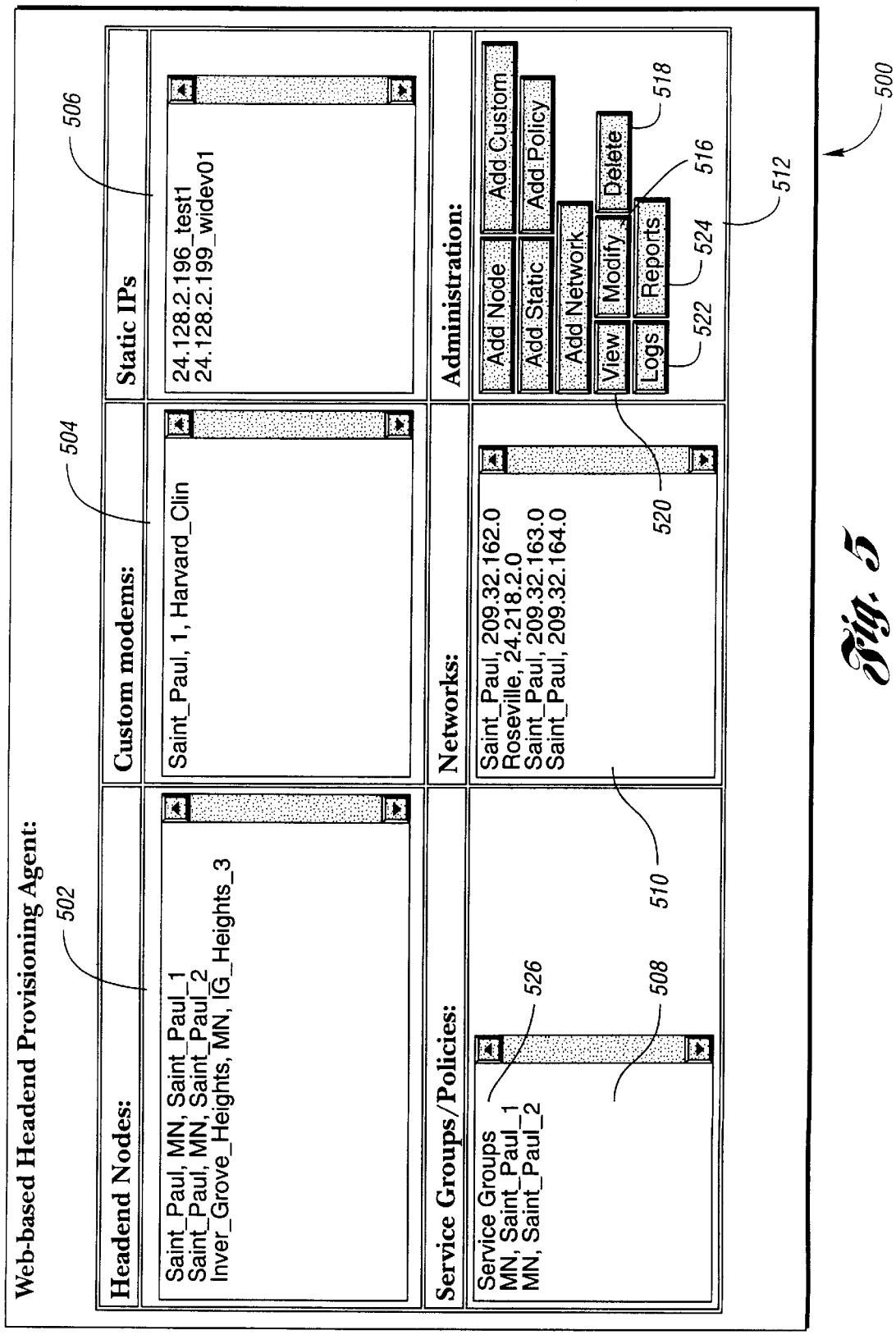
FIG. 5 is an example of a top level page display (HPA HTML page)

FIG. 5 is an example of the top level display page (HPA HTML page 500), which is divided into six sections. Headend node section 502 lists each headend node with a syntax <city name>, <state name>, <headend node name>_<headend node number>. Custom Modem section 504 lists each custom device with a syntax <headend node name >, <headend node number >, <unique name >. Static IP section 506 lists static IP addresses with a syntax <IP address >_<unique name>. At the top of the Service Groups/Policies section 508 is a "Service Groups" entry followed by the policies with a syntax <state name>, <headend name>_<network policy number>. Network section 510 lists the networks with a syntax <headend name >, <base IP address >. Administration section 512 provides entries for adding, viewing, modifying, deleting, viewing the log file, and transferring to a report HTML page.

The entries displayed in Administration section 512 vary depending upon the user level of the user 208. The "Add" entry 514, "Modify" entry 516 and "Delete" entry 518 are visible to user 208 when he has the proper user level authorization to make the changes. "View" entry 520, "Logs" entry 522 and "Reports" entry 524 are available to all users 208 at all user levels.

Figure 6A:
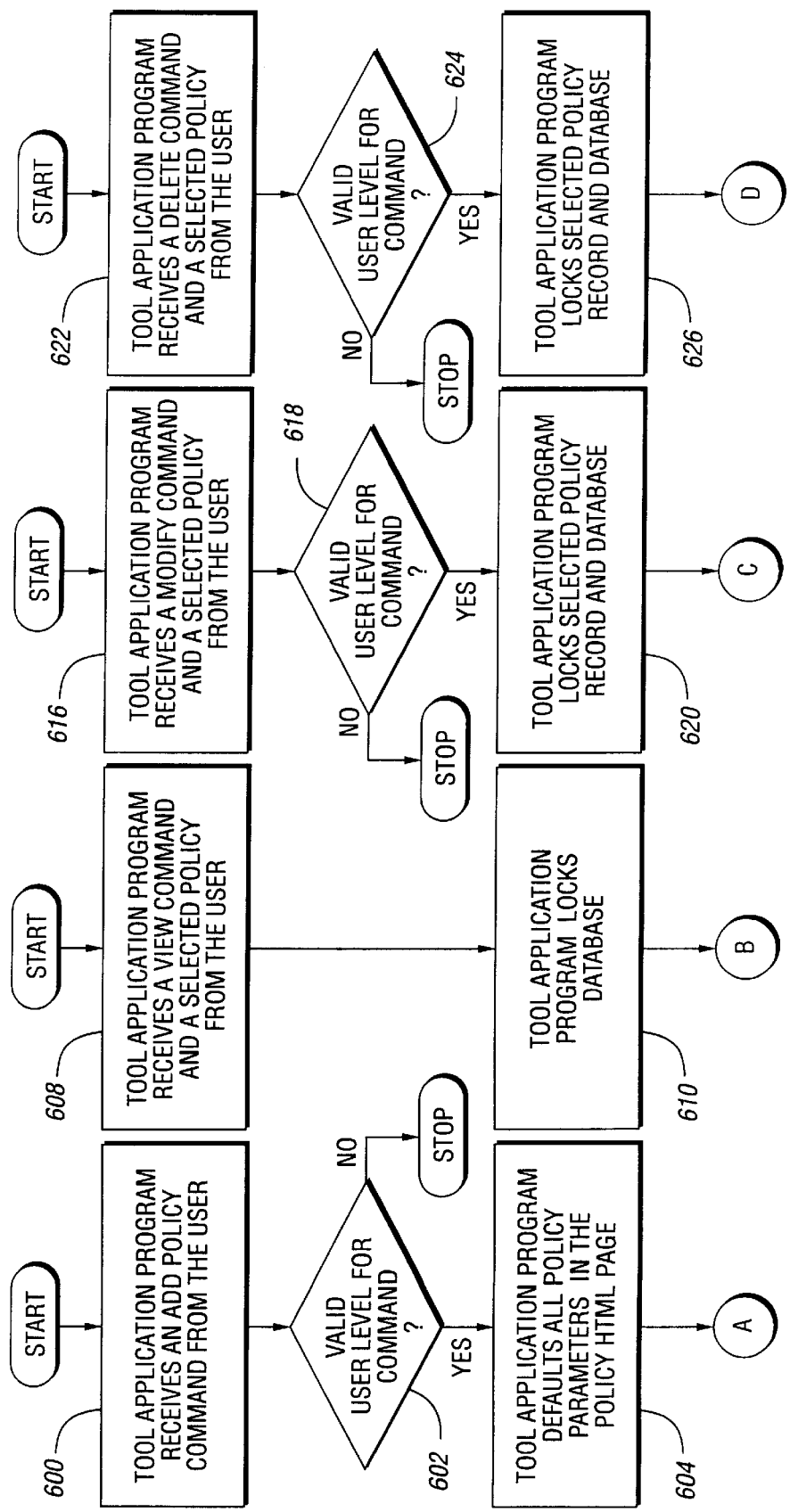
FIG. 6a–6b is a flow diagram of a process for adding, viewing, modifying and deleting a network policy.
Figure 6B:
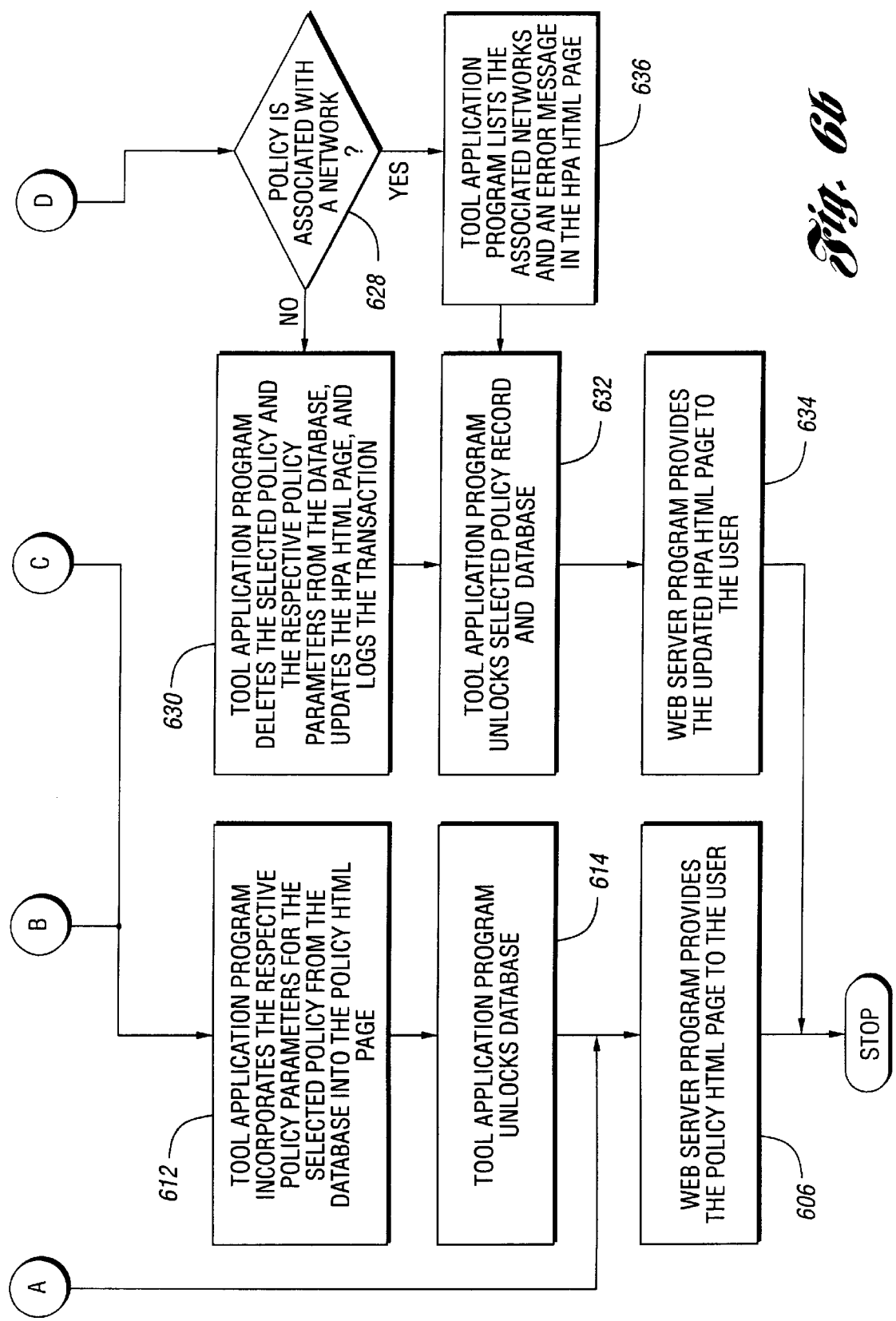

FIG. 6 is a flow diagram of a process provided to user 208 for manipulating policies. User 208 can add a new network policy, view an existing network policy, modify a network policy and delete a network policy. User 208 initiates the add network policy process, as shown by block 600, by selecting the "Add Policy" entry (shown in FIG. 5). Tool application program 200 then checks user's 208 user level, decision block 602, to determine if user 208 has the authorization to add a new network policy. If authorized, the tool application program 200 next generates a network policy HTML 700 page with all of the network policy parameters defaulted to blank values, as shown in block 604. Web server program 206 provides the network policy HTML page 700 to the user 208, as shown in block 606.

To view an existing network policy, user 208 selects one network policy from the Service Groups/Policies section 508 of the HPA HTML page 500 and then selects the "View" entry 520, as shown by block 608. Tool application 200 then locks database 204, as shown in block 610. The respective network policy parameters from the selected network policy are read from database 204 and incorporated into the network policy HTML page 700, as shown in block 612. Database 204 is then unlocked, as shown in block 614. Finally, web server program 206 provides the network policy HTML page 700 to user 208 for viewing, as shown in block 606.

Modification of an existing network policy is initiated by selecting one network policy from the Service Groups/Policy section 508 of the HPA HTML page 500 and then selecting the "Modify" entry 516, as shown in block 616. Tool application program 200 verified that user 208 has the proper user level to modify policies, decision block 618. If user 208 is authorized, then the selected network policy record withing database 204, and the entire database 204 are locked, as shown by block 620. Tool application program 200 then reads the selected network policy parameters from the database 204 and incorporates them into the network policy HTML page 700, as shown in block 612. Database 204 is then unlocked, as shown by block 614, while the selected network policy record is left locked. This prevents a second user from changing the selected record network policy while user 208 has that record "checked out" for modification. Finally, web server program 206 provides the network policy HTML page 700 to user 208, as shown in block 606.

Deletion of a network policy starts with the selection of one network policy from the Service Groups/Policy section 508 of the HPA HTML page 500 and then selecting the "Delete" entry 518, as shown in block 616. Here too, tool application program 200 checks for authorization to delete policies, decision block 624. After validating authorization, database 204 is locked, as shown in block 626. The networks defined in database 204 are then examined to determine if any use the network policy selected to be deleted, decision block 628. If there are no associated networks, then tool application program 200 erases the network policy and all of its respective network policy parameters from database 204, removes the deleted network policy from the HPA HTML page 500, and logs the transaction, as shown in block 630. Database 204 and the selected network policy record are then unlocked, as shown in block 632. Web server program 206, provides the updated HPA HTML page 500 to client 208. Where an attempt is made to delete a network policy actively assigned to a network, tool application program 200 incorporates an error message into the HPA HTML page 500, as shown in block 636.

When user 208 is creating policies, it is best to create three policies for each headend 114–116. The first two policies allow a lager grouping of all of the networks that serve a particular headend than if just one network policy is created. The third network policy provides a temporary network policy to which networks can be assigned while the other policies are being renumbered.

Figure 7:
FIG. 7 is an example of a network policy page display.

FIG. 7 is an example of a network policy HTML page 700 as it would appear when an existing network policy is being modified. Four menus 702 are available to select the city name, state name, headend node name, and network policy number. Two input fields are provided for the user 208 to enter server specific information 704. Six input fields are provided for entry of client specific information 706. The menus 702, server specific information 704 and subscriber specific information 706 initially display the parameter values stored in database 204. User 208 may modify any of these parameter values. "Make Change" entry 708 is used to indicate that all modifications have been completed. "Cancel" entry 710 return the user 208 to the HPA HTML page 500 without saving any changes. When a new network policy is being added to the database 204, the same page layout is used, with two minor differences. The first difference is that menus 702, server specific information 704 and client specific information 706 display blank values. Second, the legend of entry 708 reads "Add". When the user 208 has a user level that only allows viewing, the same page layout is used, except entry 708 is hidden.

FIG. 8 is a flow diagram of the process of leaving the network policy HTML page 700 with and without saving additions and modifications. When user 208 initiates saving an added network policy or modifications of an existing network policy by issuing a change network policy command (entry 708), as shown in block 800. Tool application program 200 then makes two checks, The first check, decision block 802, validates the user level for the proper authorization to make network policy changes. Decision block 804 validates the network policy parameters as entered by user 208. If the modified network policy parameters are not valid, then tool application program 200 inserts an error message into the network policy HTML page 700, as shown in block 805. Web server program 206 then provides the updated network policy HTML page 700 to the user 208, as shown in block 807. If both checks are successful, database 204 is locked, as shown in block 806, before saving the changes. Tool application program 200 then stores the changed network policy parameters in database 204, provides an updated dhcpcap file to the provisioning server, and logs the change, as shown in block 808. Database 204 is unlocked, as shown in block 810. Finally, web server program 206 returns user 208 to the HPA HTML page 500, as shown in block 812.

User 208 may elect to cancel a modification process by selecting the "Cancel" entry 710, as shown in block 814. Tool application program 200 responds to the cancellation by unlocking the selected network policy record, as shown in block 816. Web server program 206 then return user 208 to the HPA HTML page 500, as shown in block 812.

"Cancel" entry 710 also allows user 208 to end an add or view process. When a cancel command is received, as shown in block 818, the web server program 206 returns user 208 to the HPA HTML page 500, as shown in block 812. Tool application program 200 does not make any changes to the database 204.

Figure 9A:
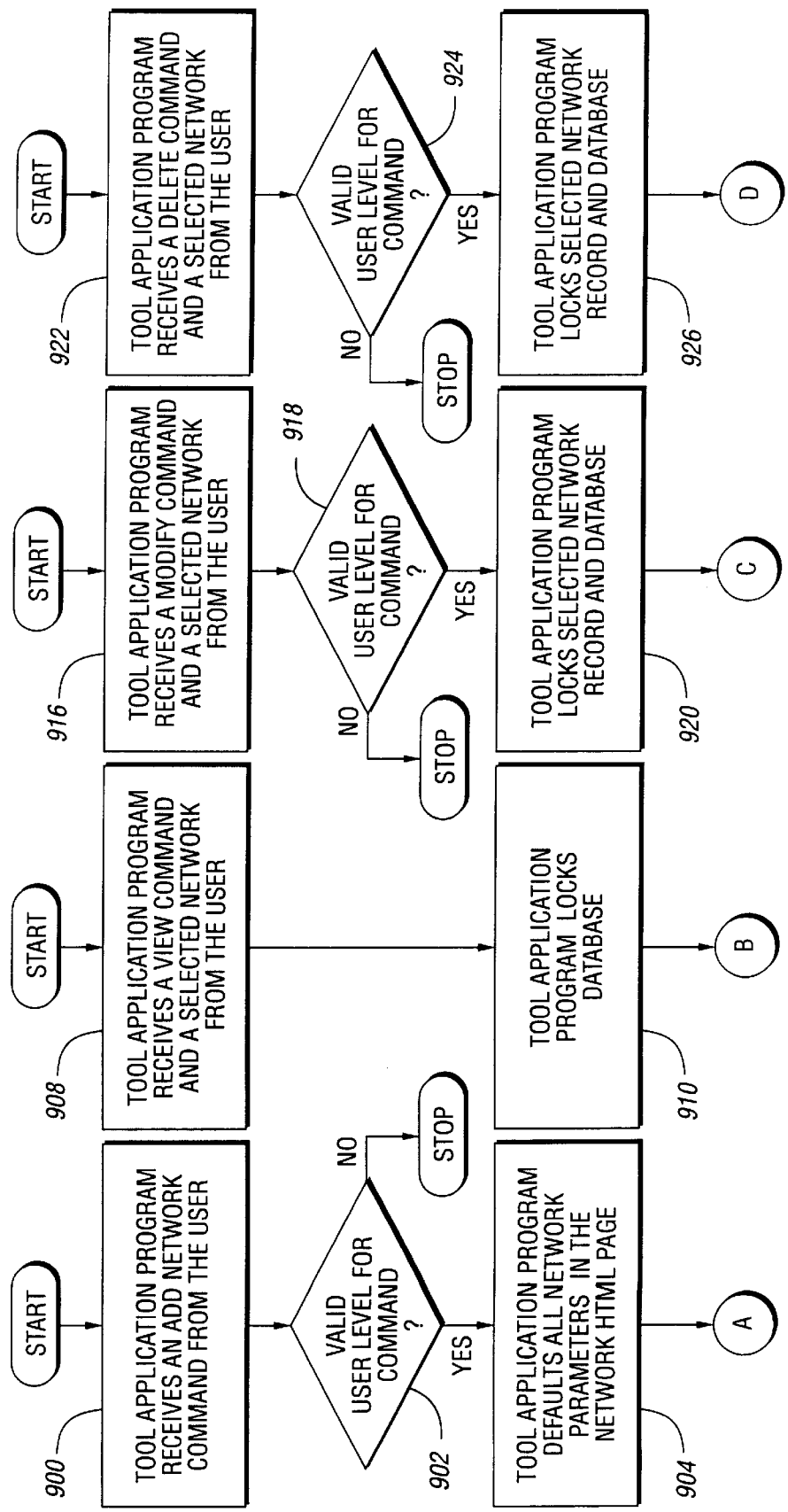

FIG. 9 is a flow diagram of a process provided to user 208 for manipulating networks. Once the policies have been created, networks can be added. In the present invention, a "network" is defined as a collection of related objects. By providing these objects (parameters) on a single HTML page, the user 208 can perform in one step what requires many steps (fifteen to twenty) on other provisioning server GUIs.

The add, view and modify function are similar to those for manipulating policies. For the add process, after receipt of an add network command, block 900, the user level is validated, block 902, the network parameters in a network HTML page 1000 are defaulted to blank, as shown in block 904, and the network HTML page is provided to user 208, as shown in block 906.

Viewing is initiated when user 208 selects an existing network and the "View" entry 520, as shown by block 908. Database 204 is locked, block 910, the parameters for the selected network are copied into the network HTML page 1000, as shown in block 912. Database 204 is unlocked in block 914. The updated network HTML page 1000 is sent to user 208, as shown in block 906.

Modifying a network is initiated when user 208 selects an existing network and the "Modify" entry 516, as shown in block 916. The user level is validated for this process as shown in decision block 918. If valid, database 204 and the selected network record are locked, as shown in block 920. Tool application program 200 reads the selected network parameters from the database, block 912, then unlocks the database, as shown in block 914. Web server program 206 then sends the network HTML page 1000 to user 208, as shown in block 906.

Cancellation of a network is simpler than cancellation of a network policy. Cancellation is started when user 208 selects the network to be canceled from the network list 510 and the "Delete" entry 518, as shown in block 922. Authorization to delete networks is validated in decision block 924. If authorized, the database and selected network record are locked, as shown in block 926. Next, tool application program 200 checks with the provisioning server programs 216 and 218 for an existing address on the selected network being deleted, as shown in block 927. If decision block 928 finds an existing address on the selected network, the tool application program 200 inserts and error message into the HPA HTML page 500, as shown in block 931. If decision block 928 does not find an existing address on the selected network, then tool application program 200 erases the selected network and its respective parameters, updates the HTML page 500, and logs the deletion, as shown in block 928. The locks are released in block 930. Then the web server program 206 sends the updated HPA HTML page 500 to user 208.

FIG. 10 is an example of a network HTML page 1000 as it would appear when an existing network is being modified. This page is divided into three sections. The first section 1002 defines the primary network by the headend name, use, network base IP address, subnet mask, and a gateway IP address. Middle section 1004 defines a link to one of the network policies, the base IP addresses of up to two secondary networks, and the dynamic IP address ranges. Section 1006 defines the service group, transmit and receive radio frequencies and loop delay to be used by the tool application program 200 in generating a default boot file for the network. When a new network is being added, all of the parameters in sections 1002, 1004 and 1006 of the network HTML page 1000 display blank values, and the legend on entry 1012 reads "Add". When a selected network is being viewed then entry 1012 is hidden. "Cancel" entry 1014 is always available and returns user 208 to the HPA HTML page 500.

Figure 11A:
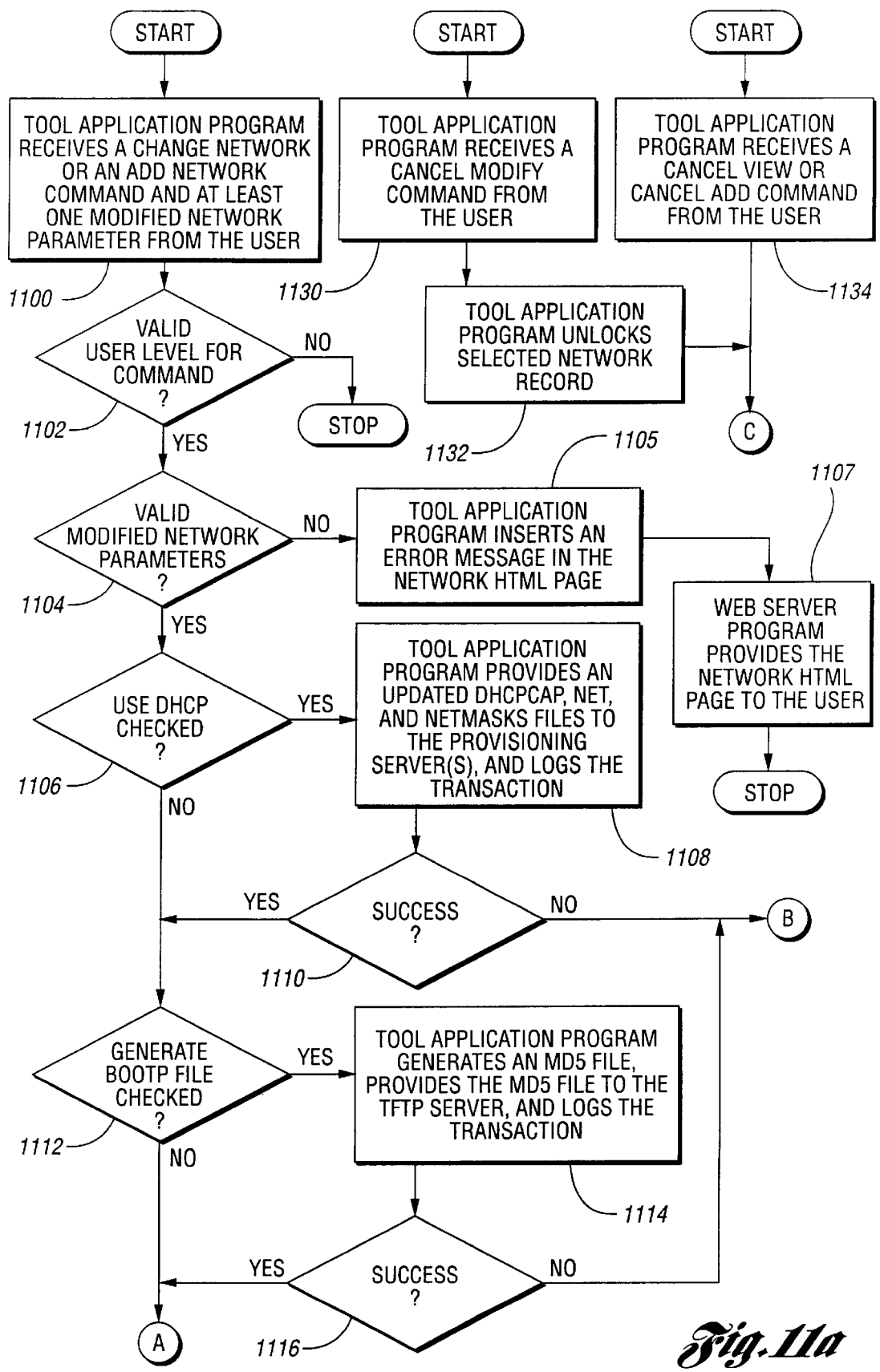

FIG. 11 is a flow diagram of the processes user 208 can initiate from the network HTML page 1000. Tool application program 200 initiates the process of adding a new network and modifying an existine, network when it receives a change network command (entry 1012), as shown in block 1100. Authorization for changing networks is then validated in decision block 1102.

The added and modified network parameters are checked in decision block 1104. Each network addition and modification submitted to the tool application program 200 encounters a series of checks. An error is reported to user 208 when any of the checks fail, as shown in blocks 1105 and 1107. A boundary check allows entry of a gateway IP address only if it is within the address range of the base network address. Bit mask checking determines if the subnet mask agrees with the network base address. Network validation verifies that the networks do not intrude on nor contain any existing network defined in the database 204. Network Duplication checking verifies that each network base address is unique.

When the Use DHCP check box 1008 is checked, as shown by decision block 1106, the tool application program 200 relays the network information to the provisioning server programs 216 and 218 in the dhcpcap, net, and netmask files, as shown in block 1108. This allows the provisioning server programs 216 and 218 to implement the networks. Otherwise, the network is reserved only in the database 204. The present invention allows multiple different dynamic IP address ranges to be defined on a network. Each dynamic IP address range has a different meaning depending up on which vendors DHCP server the tool application program 200 is configuring. In the preferred embodiment, one primary dynamic IP address range and two secondary dynamic IP addresses ranges are associated with a primary network and two secondary networks respectively. The standard definition for the primary dynamic IP address range is that of the primary network defined on the router or gateway 118. Primary networks are usually routable, while secondary networks are usually non-routable. The usual purpose of the first secondary dynamic IP address range is for support of cable modems and other equipment that does not require a routable IP address. The second secondary network is reserved for support of statically mapped head-end bridges and auto-provisioning. Any second secondary dynamic range defined assumes that auto-provisioning is enabled.

When the network changes have been successfully implemented by the provisioning servers 216 and 218, as shown by decision block 1110, then the Generate BOOTP File check box 1010 (generate bootstrap file) is examined, as shown by decision block 1112. If user 208 has checked the Generate BOOTP File check box 1010, the tool application program 200 creates a network specific default MD5 file (a bootstrap file) for legacy cable modems and transfers the MD5 files to the TFTP server program 220, as shown in block 1114. Tool application program 200 creates the default MD5 file using the service group, radio frequency and loop delay parameters selected by the user 208. The default MD5 file is given to registered and un-registered clients that are not associated with a service group or another MD5 file. After creating the default MD5 file, tool application program 200 will create a directory in the host of the TFTP server program 220 and copy the default MD5 file into that directory. (This directory is determined by the headend name and the network base IP address.)

After the MD5 file has been successfully transferred to the TFTP server program 220, as shown by decision block 1116, the tool application program 200 locks database 204, as shown in block 1118. The added add modified network parameters are stored in database 204, as shown in block 1120, and the database 204 is unlocked again, as shown in block 1122. Web server program 206 completes the process by returning the user 208 to the HPA HTML page 500, as shown in block 1124.

Where the decision blocks 1110 or 1116 are not successful, the tool application program 200 incorporates an appropriate error message into the network HTML page 1000. Web server program 206 then provides the updated network HTML page 1000 with the error messages to user 208, as shown in block 1128.

FIG. 12 is a flow diagram of a process that displays the service groups to the user 208. The process starts when user 208 enters "Service Groups" 526 from the Service Groups/Policies section 508, and the "View" entry 520 from the Administration section 512 of the HPA HTML page 500 illustrated in FIG. 5, as shown in block 1200. Tool application program 200 then locks database 204, as shown in block 1202, and incorporates the service groups from the database 204 into a service group HTML page 1300, as shown in block 1204. Database 204 is unlocked as shown in block 1206. Finally, web server program 206 provides the service group HTML page 1300 to the user 208, as shown in block 1208.

Figure 13:
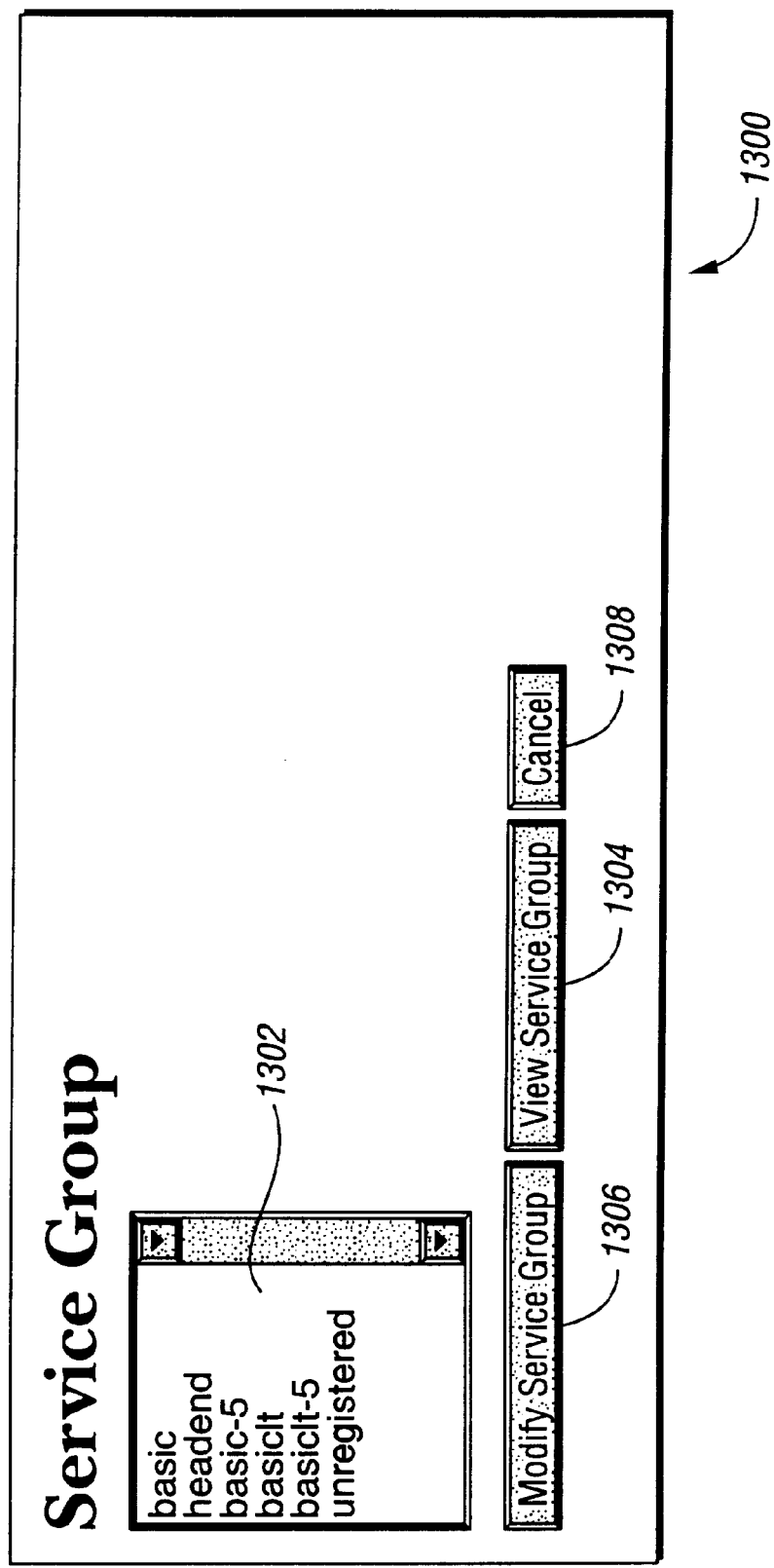
FIG. 13 is an example of a service group display page.

FIG. 13 is an example of the service group HTML page 1300. This page contains a listing 1302 of all service groups defined, and up to three entries. To view the parameters of a service group, user 208 selects the desired service group from the listing 1303 and selects the "View Service Group" entry 1304. Where the user 208 has the appropriate user level, then the "Modify Service Group" entry 1306 will also be available. "Cancel" entry 1308 returns user 208 to the HPA HTML page 500.

Figure 14:
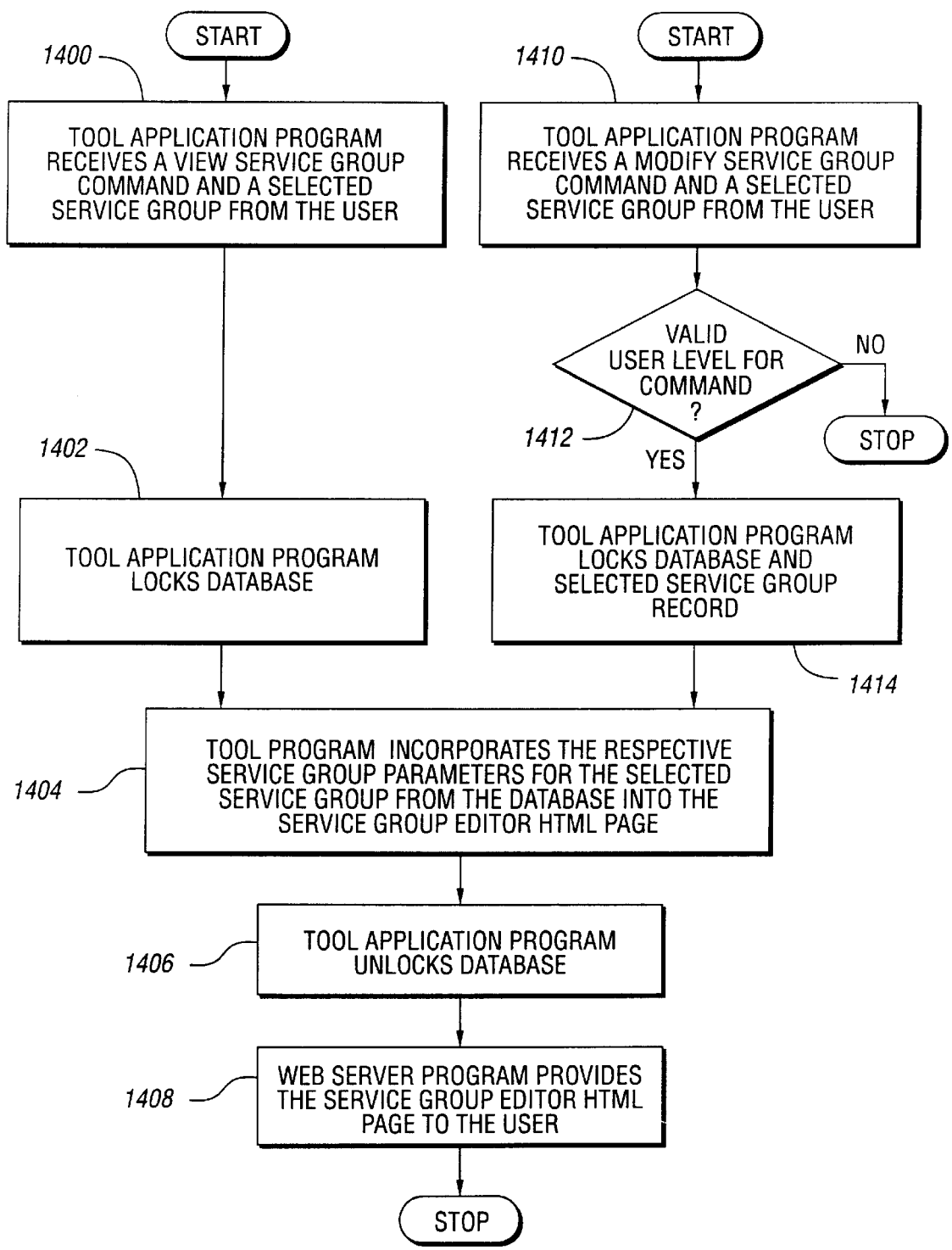
FIG. 14 is a flow diagram of a process for viewing and modifying a service group.

FIG. 14 is a flow diagram of a process for displaying a selected service group from the service group listing 1302. Viewing is initiated in block 1400 when the tool application program 200 receives the selected service group and a view service group command (entry 1304) from user 208. Database 204 is locked as shown in block 1402. The respective service group parameters from the selected service group are read from database 204 and incorporated into a service group editor HTML page 1500, as shown in block 1404. The database 204 is unlocked in block 1406, and the service group editor HTML page 1500 is provided to user 208, as shown in block 1408.

Modification of a service group is initiated when tool application program 200 receives the selected service group to be modified, and the "Modify Service Group" entry 1306 from user 208, as shown in block 1410. User level is validated by decision block 1412 for proper authorization. If authorized, the database 204 and selected service group record are locked, as shown in block 1414. Tool application program 200 then reads the respective service group parameters from the database 204 and incorporates them into the service group editor HTML page 1500, as shown in block 1404. Database 204 is unlocked, as shown in block 1406, and the service group editor HTML page 1500 is provided to user 208, as shown in block 1408.

FIG. 15 is an example of a service group editor HTML page 1500. Other than the service group name and an optional update file name, all of the service group parameters are controlled by limiting the user's 208 choices with menu selections. Limiting service group parameter selections helps provide commonality between editing service groups for legacy cable modems and DOCSIS cable modems because the same parameters are used for generating the boot files for both types of cable modems. User 208 is provided with an "Apply Changes" entry 1502 to save any changes made, or the "Cancel" entry 1504 to return to the HPA HTML page 500 without saving any changes.

Figure 16:
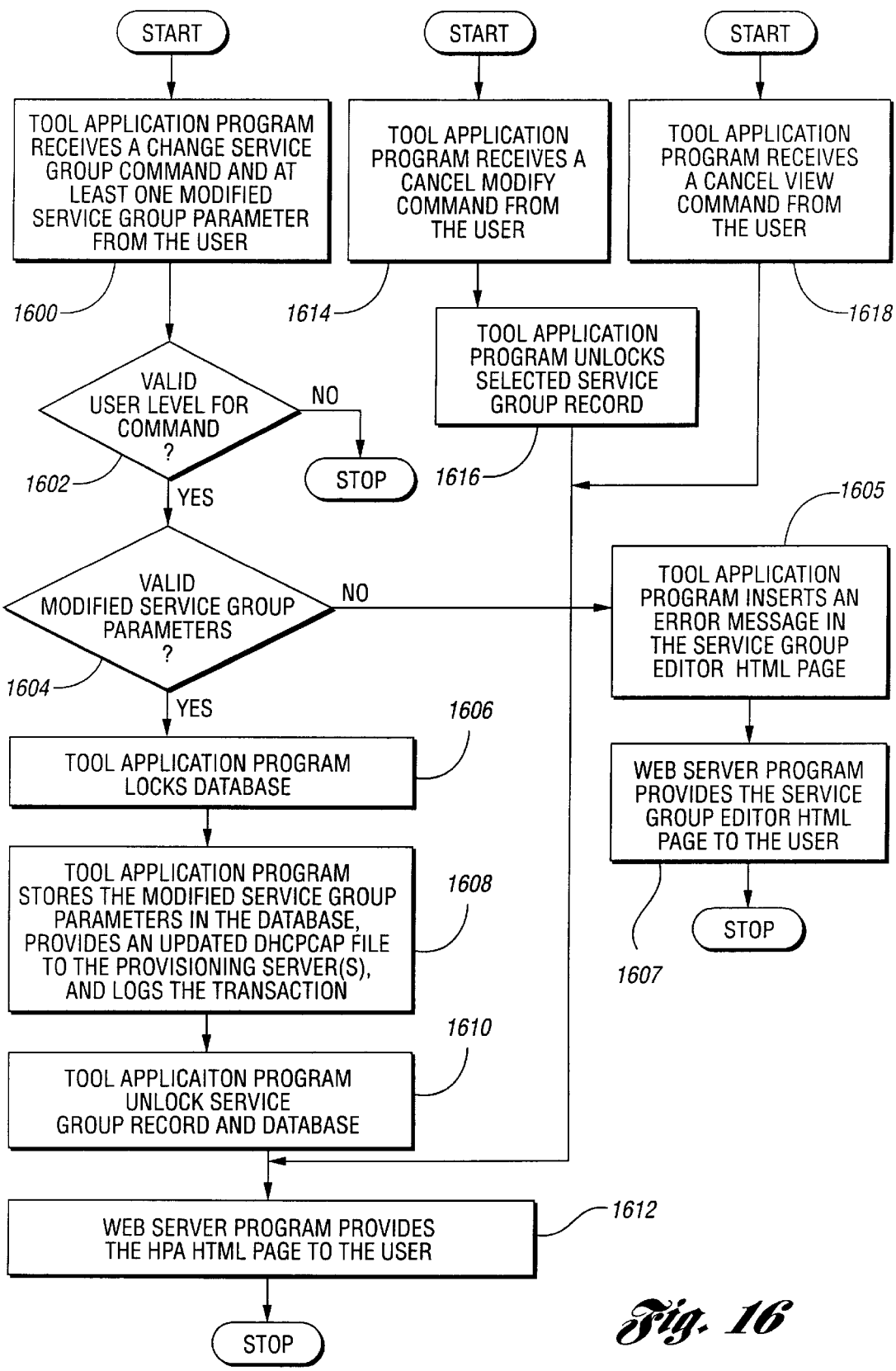
FIG. 16 is a flow diagram of a process for changing service group parameters.

FIG. 16 is a flow diagram associated with the service group editor HTML page 1500. Tool application program 200 initiates saving changes to the selected service group when it receives the modified service group parameters and a change service group command ("Make Changes" entry 1502) from user 208, as shown in block 1600. User level is validated by decision block 1602 for authorization. If authorized the modifications to the service group parameters are validated, as shown by decision block 1604. Since most of the service group parameter selections are limited by menu selections, the only parameter to validate is the service name 1506. The entered service name 1506 is checked against other service names for duplications. Where validation fails, an error message is inserted into the service group editor HTML page 1500, as shown in block 1605, and the updated page is provided to user 208, as shown in block 1607. Where validation passes, database 204 is then unlocked, as shown in block 1606. The modified service group parameters are stored in database 204, an updated dhcpcap file is provided to the provisioning server programs 216 and 218, and the modification is logged, as shown in block 1608. Database 204 and the selected service group record are the unlocked, as shown in block 1610. Web server program 206 then returns user 208 to the HPA HTML page 500, as shown in block 1612.

Cancellation of the modify service group process is initiated when tool application program 200 receives a cancel modification command ("Cancel" entry 1504) from user 208, as shown in block 1614. The record for the selected service group is unlocked, as shown in block 1616, and HPA HTML page 500 is provided to user 208, as shown in block 1612.

Cancellation of a view service group process is initiated when tool application program 200 receives a cancel view command (also "Cancel" entry 1504), as shown in block 1618. Web server program 206 then provides the HPA HTML page 500 to user 208, as shown in block 1612.

Figure 17A:
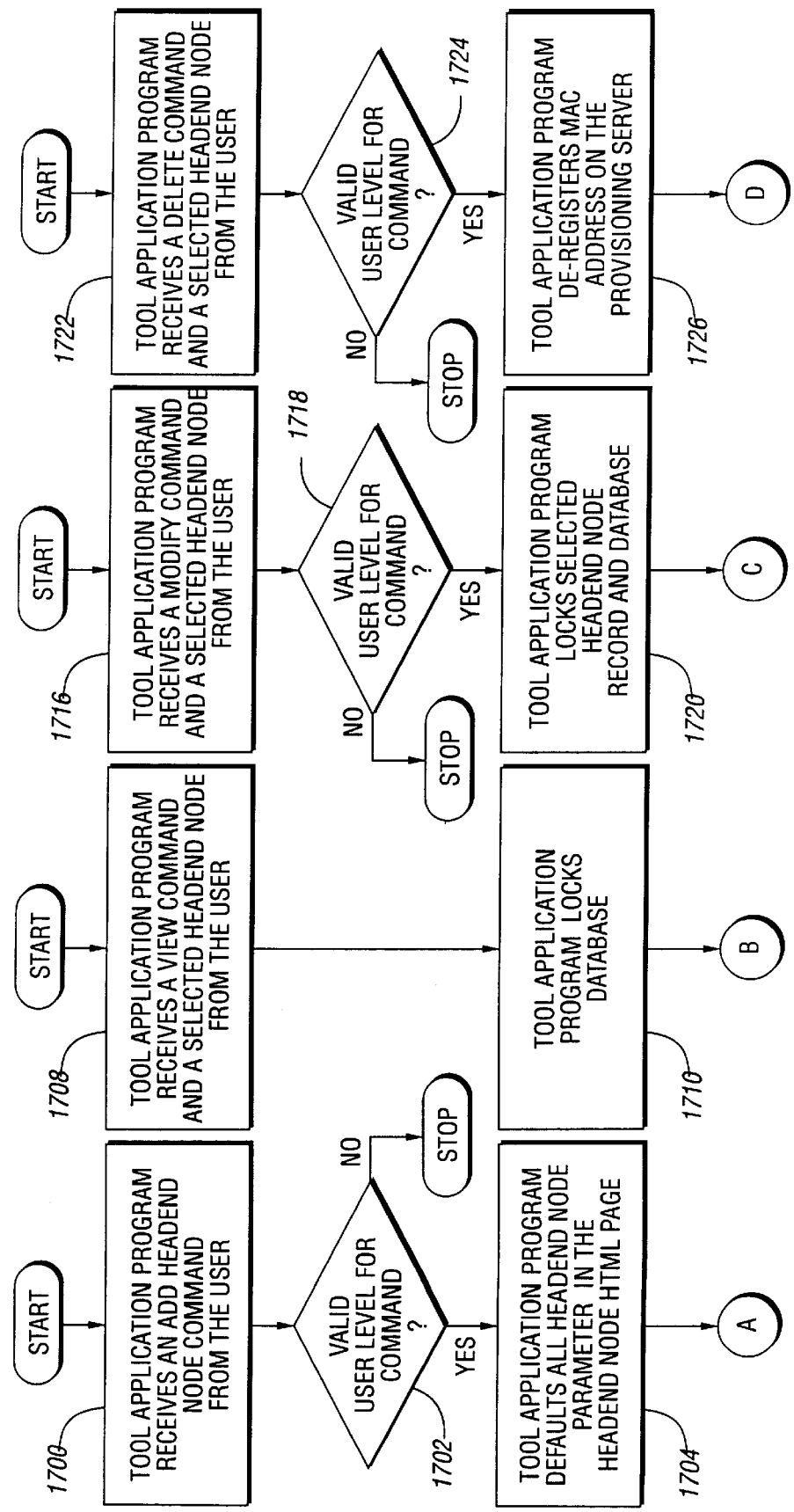

FIG. 17 is a flow diagram of a process to manipulate the headend nodes. Additions, viewing and modifications to the headend nodes are similar to that of the policies and networks. A headend node addition is started when tool application program 200 receives a command to add a headend node from user 208, as shown in block 1700. User level is validated by decision block 1702. The headend node parameters in a headend node HTML page 1800 are set to default values, as shown in block 1704. Finally, the headend node HTML page 1800 is provided to the user 208 by the web server program 206, as shown in block 1706.

Viewing the parameters of an existing headend node is initiated when tool application program 200 receives the selected headend node and the "View" entry 520, as shown in block 1708. Next, database 204 is locked, as shown in block 1710. The headend node parameters are read from database 204 and incorporated into the headend node HTML page 1800, as shown in block 1712. Database 204 is unlocked, as shown in block 1714. Then the headend node HTML page 1800 is provided to user 208, as shown in block 1706.

Modifying a selected headend node starts with the selection of the headend node to be modified, and the "Modify" entry 516, as shown in block 1716. User level is validated in decision block 1718, and if valid, database 204 and the record of the selected headend node are locked, block 1720. Parameters for the selected headend node are incorporated into the headend node HTML page 1800, as shown in block 1712. Database 204 is unlocked in block 1714, and the headend node HTML page 1800 is provided to user 208, as shown in block 1706.

Deletion of a headend node is initiated in block 1722. After user level validation, decision block 1724, the tool application program 200 de-registers the MAC address of the selected headend node with the cable modem provisioning server program 218. If de-registration were successful, the yes branch of decision block 1728, then database 204 and the selected headend node record are locked, as shown in block 1730. Tool application program 200 then erases the selected headend node and its respective parameters, updates the HPA HTML page 500, and logs which headend node was deleted, the user name, the record, and time of deletion, as shown in block 1732. Database 204 and the selected headend node record are then unlocked, as shown in block 1734. Web server program 200 provides the updated HPA HTML page 500 to user 208, as shown in block 1736. Should de-registration of the selected headend node's MAC address fail, the No branch of decision block 1728, then the tool application program 200 inserts and error message into the HPA HTML page 500, as shown in block 1738.

FIG. 18 is an example of a headend node HTML page 1800 as it would appear when an existing headend node is being modified. User 208 uses this page to add, modify and view headend node parameters, including the city name, state name, headend name, headend node number, MAC address, IP address and a link to a selected service group. A "Generate DNS for Node" check box 1802 is provided to instruct the tool application program 200 to generate a DNS name for this headend node. When a new headend node is being entered, all of the parameters are defaulted to blank values, and the legend on entry 1804 reads "Add". When a selected headend node is only being viewed, entry 1804 is hidden. "Cancel" entry 1806 returns user 208 to the HPA HTML page 500.

Figure 19A:
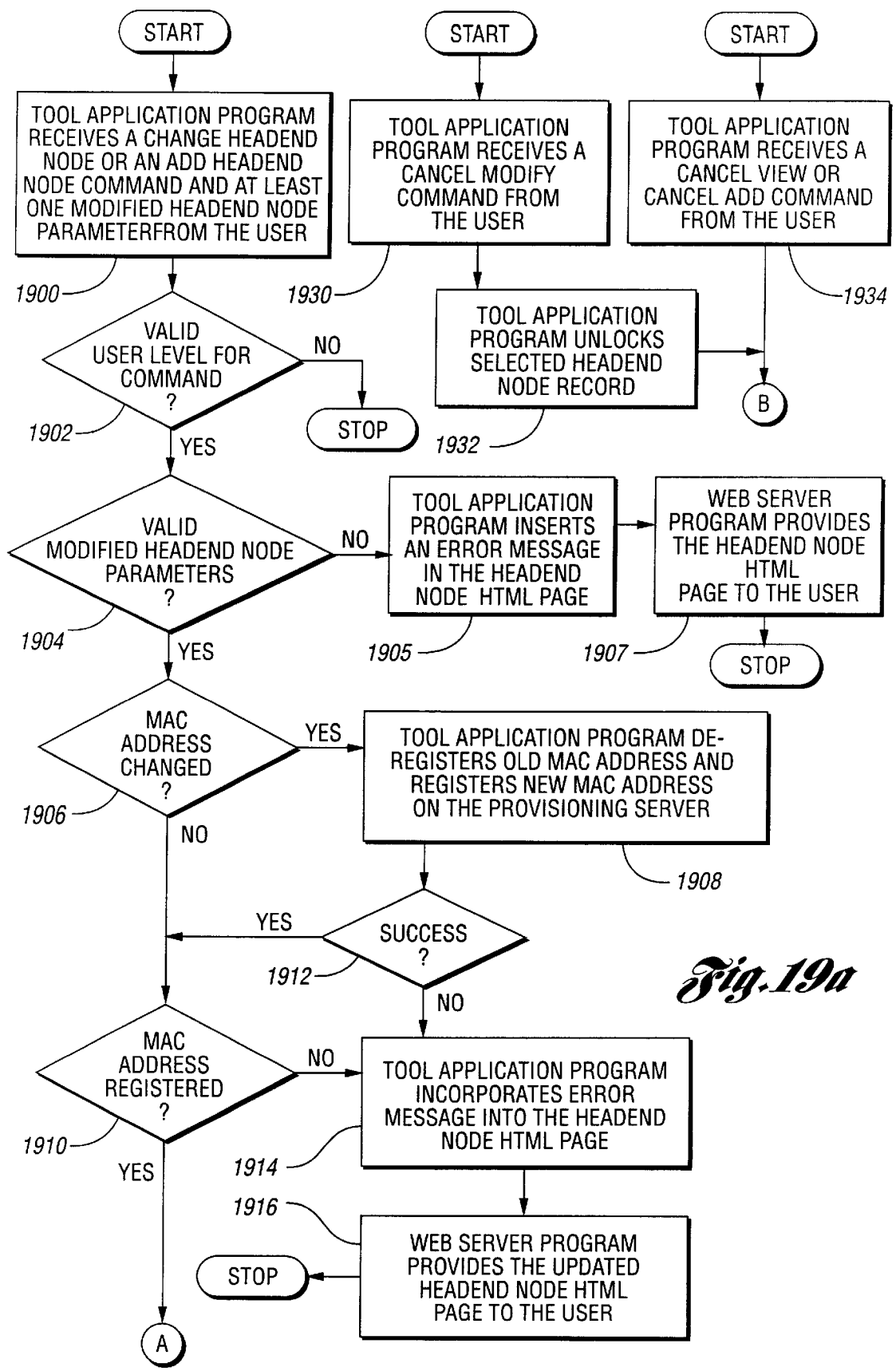
FIG. 19a–19b is a flow diagram of a process for changing headend node parameters.
Figure 19B:
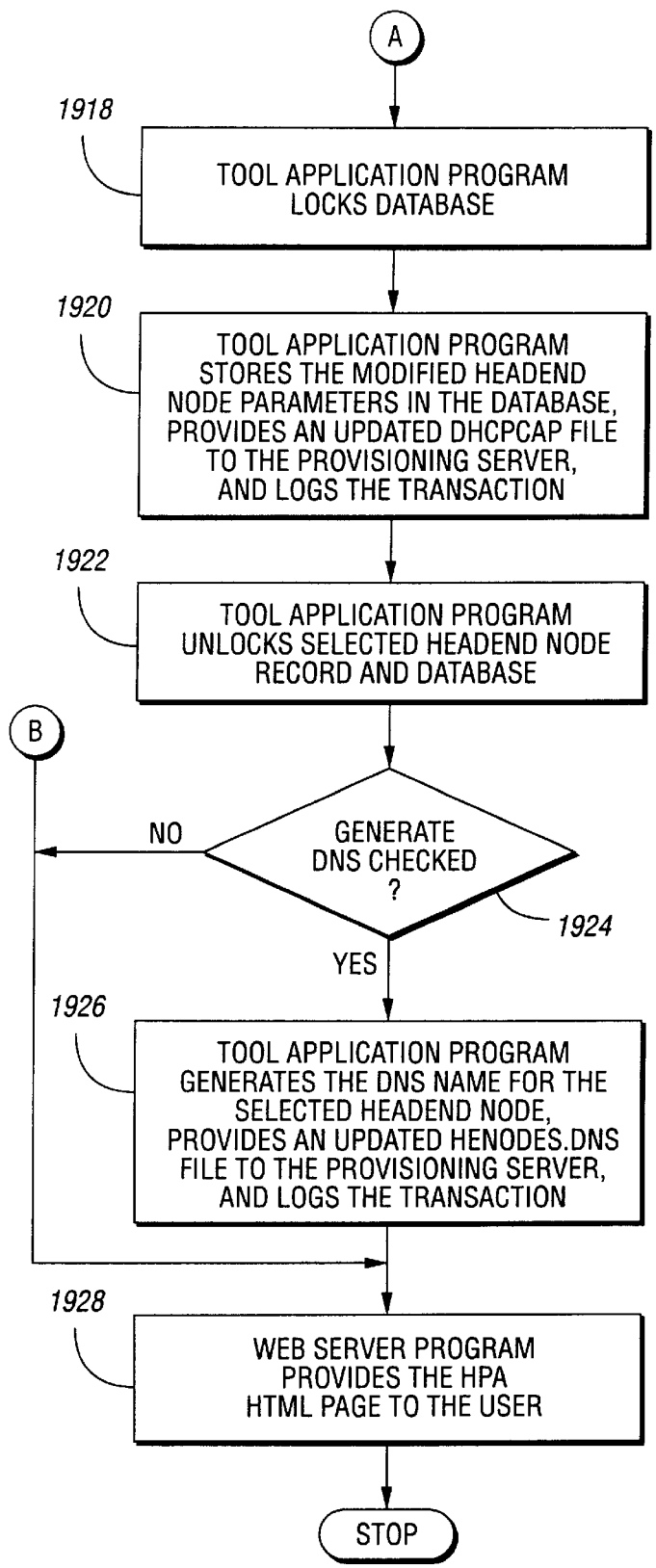

FIG. 19 is a flow diagram associated with the headend node HTML page 1800. Tool application program 200 receives additions and modifications when user 208 selects entry 1804, as shown in block 1900. User level is validated in block 1902 for authorization to add and modify headend nodes.

When adding or modifying a headend node, several checks are performed to validate the changes, as shown in decision block 1904. The state name, city name, headend name and headend node number are compared with those already in the database 204 to avoid duplication. Tool application program 200 uses these parameters when generating the DNS name, so if they are unique, then the generated DNS name should also be unique. The headend node's MAC address is compared with the MAC addresses known to the Cable modem provisioning server program 218. Duplicate MAC addresses are not allowed. The headend node's IP address is checked against database 204 for duplicate IP addresses, including the IP addresses of routers, broadcast IP addresses, and network base IP addresses. If any of these checks fail, then an error message if returned to user 208, as shown in blocks 1905 and 1907.

When the user level and headend node validation checks have passed, tool application program 200 determines if the MAC address of the headend node has changed, as shown by decision block 1906. If the MAC address has changed, then the old MAC address is de-registered and the new MAC address is registered with the cable mode provisioning server program 218, as shown in block 1908. If the MAC address was not changed, the tool application program 200 checks with the cable modem provisioning server 218 to check if the MAC address of the headend node is registered, as shown in decision block 1910. If the MAC address is not registered, or the de-registration/registration change of MAC addresses was not successful, the No branch of decision block 1912, then an error message is incorporated into the headend node HTML page 1800, as shown in block 1914. Web server program 206 then sends the updated headend node HTML page 1800 with the error message to user 208, as shown in block 1916.

Where the headend node's MAC address is registered with the cable modem provisioning server program 218, the tool application program 200 locks the database 204, as shown in block 1918. The changed headend node parameters are stored in the database 204, the dhcpcap file is updated and sent to the cable modem provisioning server program 218, and an entry is made in the log file 228 indicating what change took place, who made the change, what record was changed, and when the change took place, as shown in block 1920. The database 204 is then unlocked, as shown in block 1922.

Tool application program 200 also determines if the "Generate DNS for Node" check box 1802 is checked, decision block 1924. When it is checked, tool application program 200 generates a unique DNS name for that selected headend node, provides an updated henodes.dns file to the cable modem provisioning server program 218, and logs the transaction in the log file 228, as shown in block 1926. Finally, web server program 206 returns user 208 to the HPA HTML page 500, as shown in block 1928.

User 208 selects the "Cancel" entry 1806 to cancel a headend node modification without saving the changes, as shown in block 1930. Tool application program 200 unlocks the selected headend node record, as shown in block 1932, and then user 208 is returned to the HPA HTML page 500.

User 208 selects the "Cancel" entry 1806 to cancel a view headend node, or add headend node process, as shown in block 1934. Web server program 206 then returns user 208 to the HPA HTML page 500, as shown in block 1928.

Figure 20A:
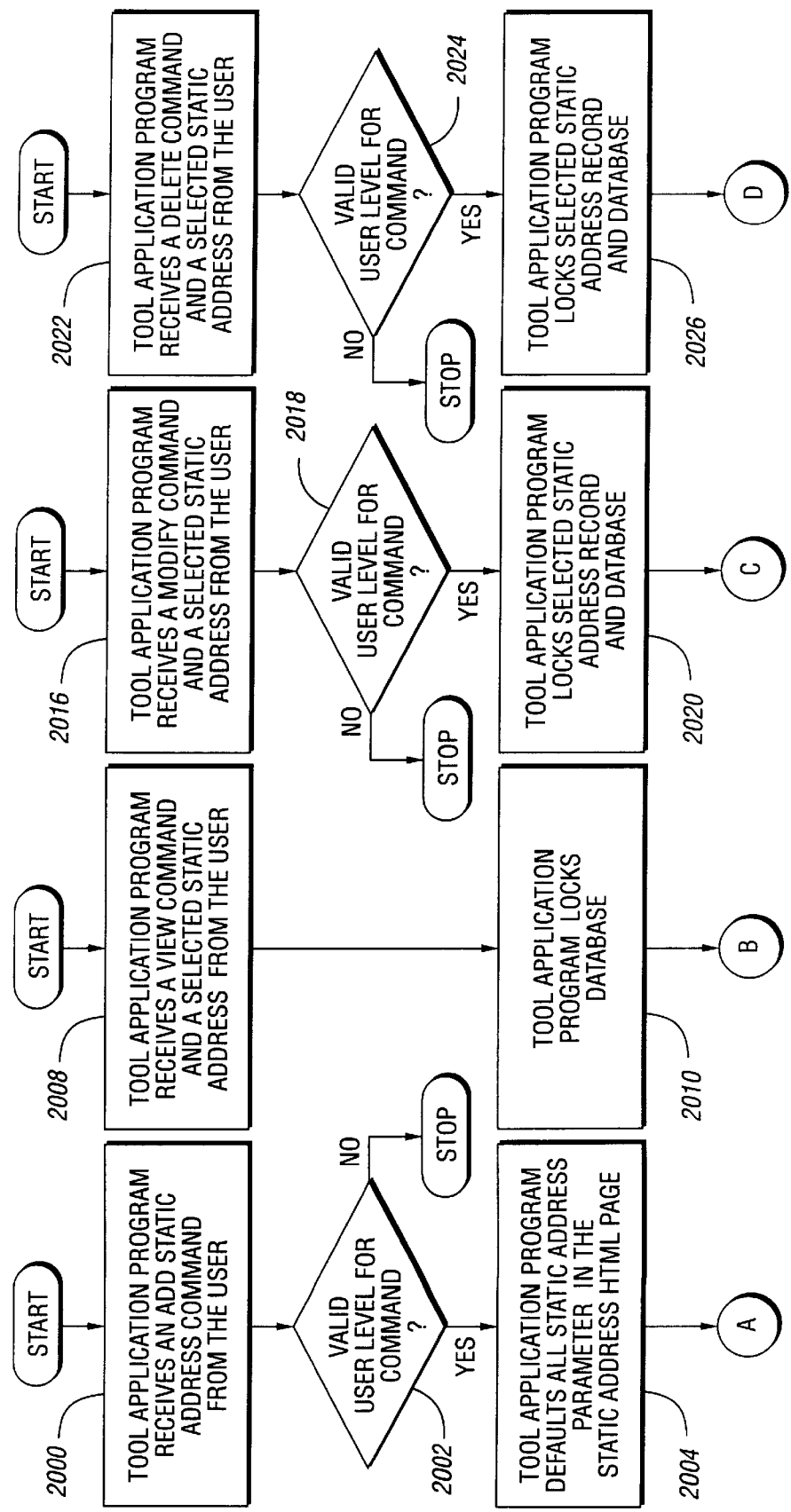
FIG. 20a–20b is a flow diagram of a process for adding, viewing, modifying and deleting a static IP address.
Figure 20B:
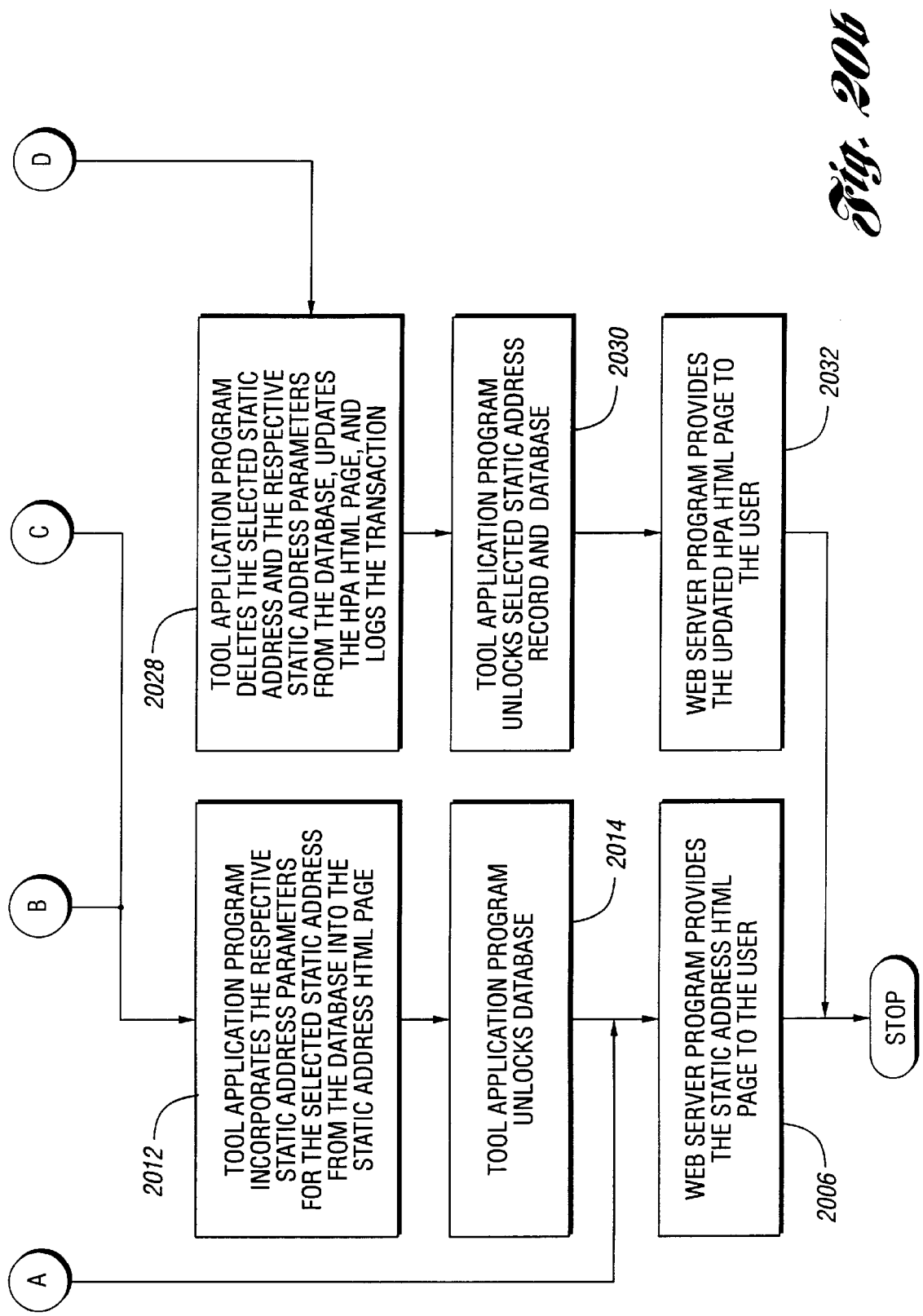

FIG. 20 is a flow diagram of a process for manipulating the static IP addresses. Adding a new static address is the same as adding a headend node or adding a network. Tool application program 200 receives and add static command from the user 208, as shown in block 2000. The user level is validated in decision block 2002. A default static address HTML page 2100 is generated, as shown in block 2004. Then web server program 206 provides the static address HTML page 2100 to the user 208, as shown in block 2006.

Viewing a static address is initiated when tool application program 200 receives a seleted static address and the "View" entry 520 is selected, as shown in block 2008. Database 204 is locked as indicated in block 2010. The static address parameters are read from database 204 add incorporated into the static address HTML page 2100, as shown in block 2012. Database 204 is then unlocked, block 2014. Finally, the static address HTML page 2100 is provided to user 208, as shown in block 2006.

Modification of a static address is started when a static address is selected and the "Modify" entry 516 is selected, as shown in block 2016. The user level for modifying static addresses is validated in block 2018. If valid, the database 204 and selected static address record are locked, as shown in block 2020. Static address parameters are copied in block 2012 from the database 204 to the static address HTML page 2100. Database 204 is unlocked in block 2014. The static address HTML page 2100 is provided to user 208, as shown in block 2006.

Deletion of a static address starts when user 208 selects the static address to be deleted, and the "Delete" entry 518, as shown in block 2022. User level to delete static addresses is validated in decision block 2024. If validation is successful, the database 204 and selected static address record are locked, as shown in block 2026. Tool application program 200 erases the selected static address and its respective parameters from the database 204, updates the HPA HTML page 500, and logs the deletion in log file 228, as shown in block 2028. The selected static address record is then unlocked, block 2030, and user 208 is returned to the HPA HTML page 500, as shown in block 2032.

FIG. 21 is an example of a static address HTML page 2100 as it would appear when an existing static IP address is being modified. This page identifies the state name, city name, headend node name, and headend node number where a selected IP address can be found. The page allows a unique name, hardware address and remarks to be associated with the selected static IP address. In addition, a "Generate DNS" check box 2102 can be selected to instruct the tool application program 200 to generate a DNS name for the selected static IP address. When a new static address is being created, all of the fields on the static address HTML page 2100 are defaulted to blank values, and the legend of entry 2104 reads "Add". When a selected static IP address is being viewed, entry 2104 is hidden. "Cancel" entry 2106 returns the user 208 to the HPA HTML page 500.

Figure 22:
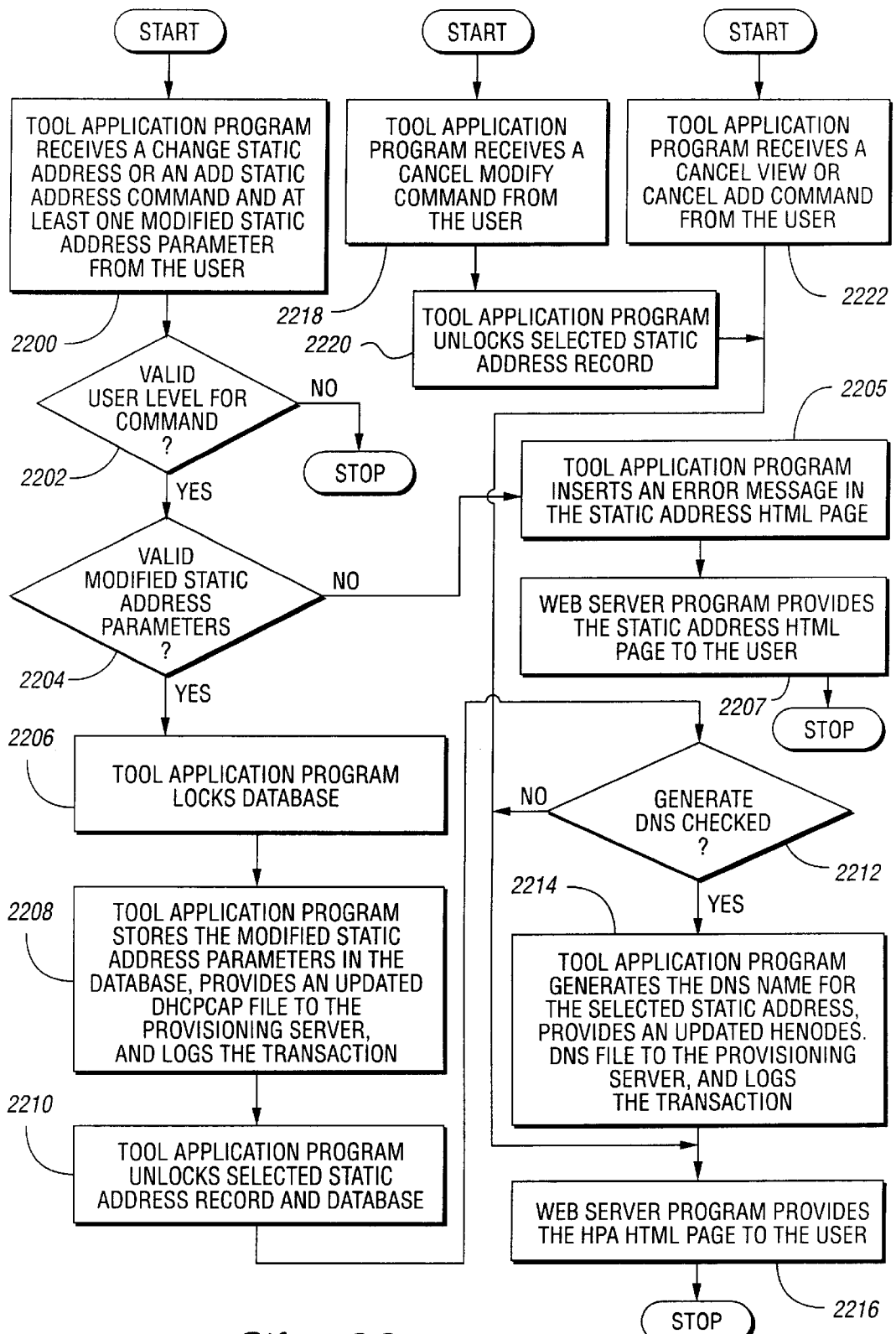
FIG. 22 is a flow diagram of a process for changing static IP address parameters.

FIG. 22 is a flow diagram for the processes initiated from the static address HTML page 2100. Tool application program 200 initiates changes to the static address in block 2200 when it receives a change static address command ("Make Changes" entry 2104) and the selected static address from user 208. User level is then validated in decision block 2202. Validation checks of the added and modified static address parameters are made in decision block 2204. Parameter validation checks include making sure that a static address exists within one of the networks, no duplications of static addresses or hardware addresses, and no use of restricted names in the Unique Name field. Where the parameter checks fail, an error message is returned to the user 208, as shown in blocks 2205 and 2207. When the user level and parameter checks are successful, database 204 is locked, as shown in block 2206. Tool application program 200 then stores the changed static address parameters in database 204, provides an updated dhcpcap file to the provisioning servers 216 and 218, and logs the transaction, as shown in block 2208. Database 204 is then unlocked in block 2210.

When the "Generate DNS" check box 2102 is checked, the tool application program 200 generates a DNS name for the selected static address, updates the henodes.dns file, and logs the change, as shown in block 2214. Finally, web server program 206 returns the user 208 to the HPA HTML page 500, as shown in block 2216.

Cancellation of a modify static address process starts with the receipt of a cancel modify command ("Cancel" entry 2106) from user 208, as shown in block 2218. The selected static address record is unlocked, as shown in block 2220. Finally, user 208 is returned to the HPA HTML page 500, as shown in block 2216.

Cancellation of an add static address and view static address process starts with the receipt of a cancel add and cancel view commands respectively, block 2222. Web server program 206 then return user 208 to the HPA HTML page 500, as shown in block 2216.

Figure 23A:
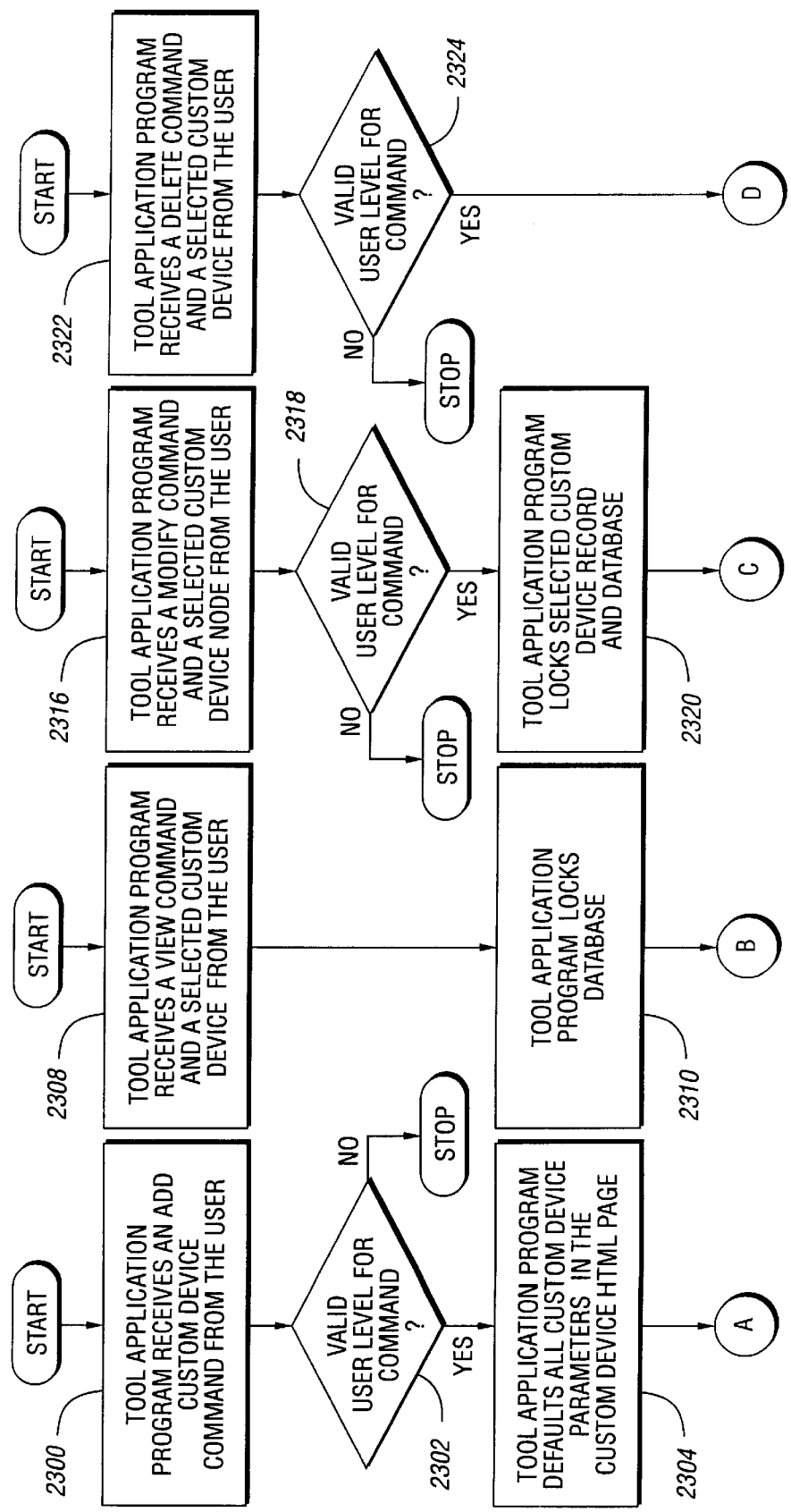
FIG. 23a–23b is a flow diagram of a process for adding, viewing, modifying and deleting custom devices.
Figure 23B:
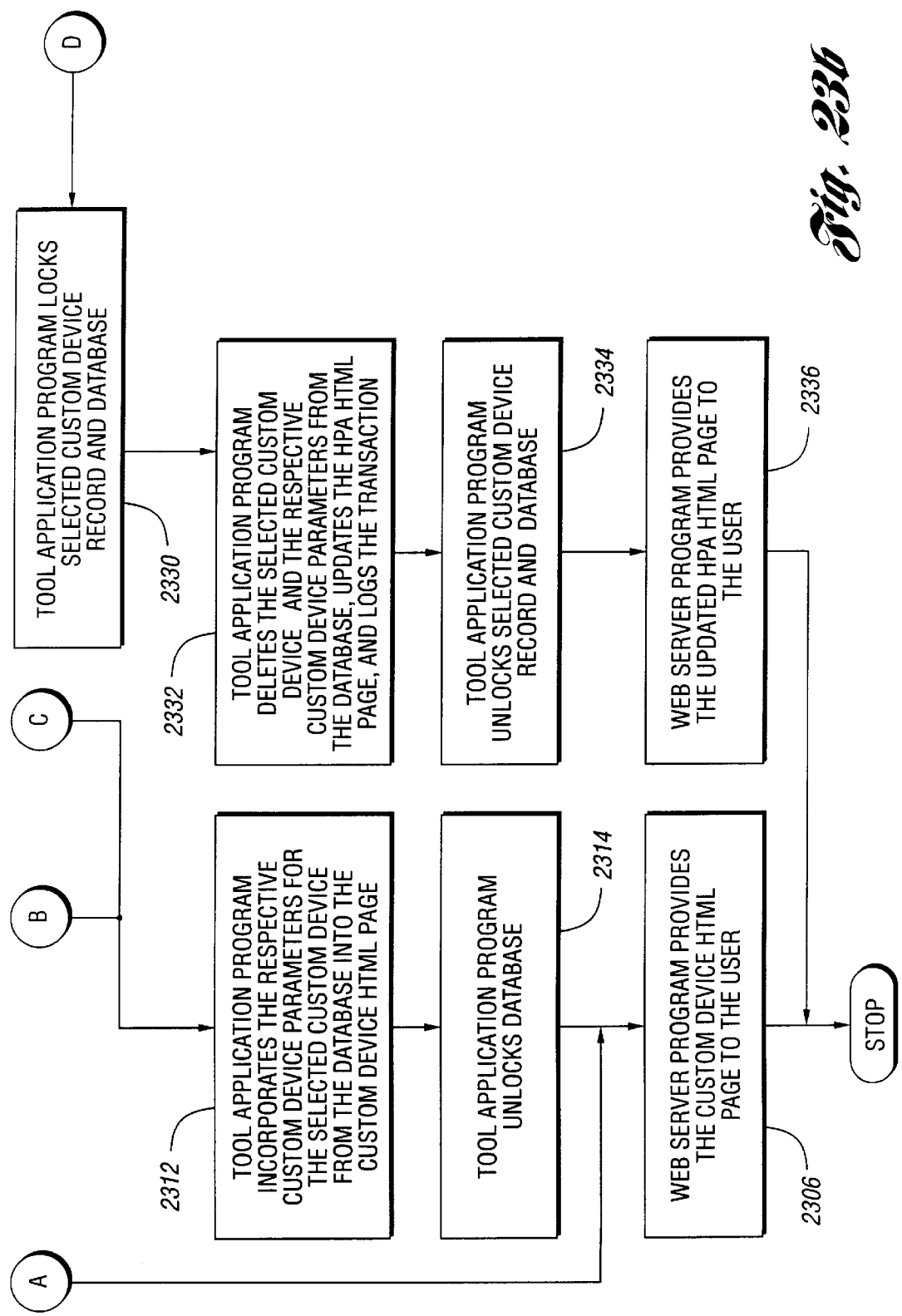

FIG. 23 is a flow diagram for custom devices. A custom device addition is started when tool application program 200 receives and add custom device command from user 208, as shown in block 2300. User level is validated by decision block 2302. The custom node parameters in a custom node HTML page 2400 are set to default values, as shown in block 2304. Finally, the custom device HTML page 2400 is provided to the user 208 by the web server program 206, as shown in block 2306.

Viewing the parameters of an existing custom device is started when tool application program 200 receives the selected custom device and the "View" entry 520, as shown in block 2308. Next, database 204 is locked, as shown in block 2310. The custom device parameters are read from database 204 and incorporated into the custom device HTML page 2400, as shown in block 312. Database 204 is unlocked, as shown in block 2314. Then the custom device HTML page 2400 is provided to user 208, as shown in block 2306.

Modifying a selected custom device starts with the selection of the custom device, and the "Modify" entry 516, as shown in block 2316. User level is validated in decision block 2318, and if valid, database 204 and the record of the selected custom device are locked, as shown in block 2320. Parameters for the selected custom device are incorporated into the custom device HTML page 2400, as shown in block 2312. Database 204 is unlocked in block 2314, and the custom device HTML page 2400 is provided to user 208, as shown in block 2306.

Deletion of a custom device is initiated in block 2322. After user level validation, decision block 2324, the tool application program 200 locks database 204 and the selected custom device record, as shown in block 2330. Tool application program 200 then erases the selected custom device and its respective parameters, updates the HPA HTML page 500, and logs the deletion, as shown in block 2332. Database 204 and the selected headend node record are then unlocked, as shown in block 2334 Web server program 200 provides the updated HPA HTML page 500 to user 208, as shown in block 2336.

Figure 24:
FIG. 24 is an example of a custom device page display.

FIG. 24 is an example of a custom device HTML page 2400 as it would appear when an existing custom device is being modified. Through this page a selected custom device may have a static IP address assigned, be given a different service group, and have preloading MAC addresses defined for a customized MD5 file. The words "node", "network", "headend", "custom" or "other" are restricted and cannot be used for the entered Unique Name. Standard custom device parameters are selected and entered in the top section 2402 of the custom device HTML page 2400. The lower section 2404 provides for the entry of preloading MAC addresses and the network IP address of a multi-user cable modem when the "Lcw Mac Address Preloading" check box 2406 is checked. As with the other HTML pages, if a new custom device is being added, then all of the fields are defaulted to blank values, and the legend on entry 2408 reads "Add". When an existing custom device is being viewed, then entry 2408 is hidden. "Cancel" entry 2410 returns the user 208 to the HPA HTML page 500.

Figure 25A:
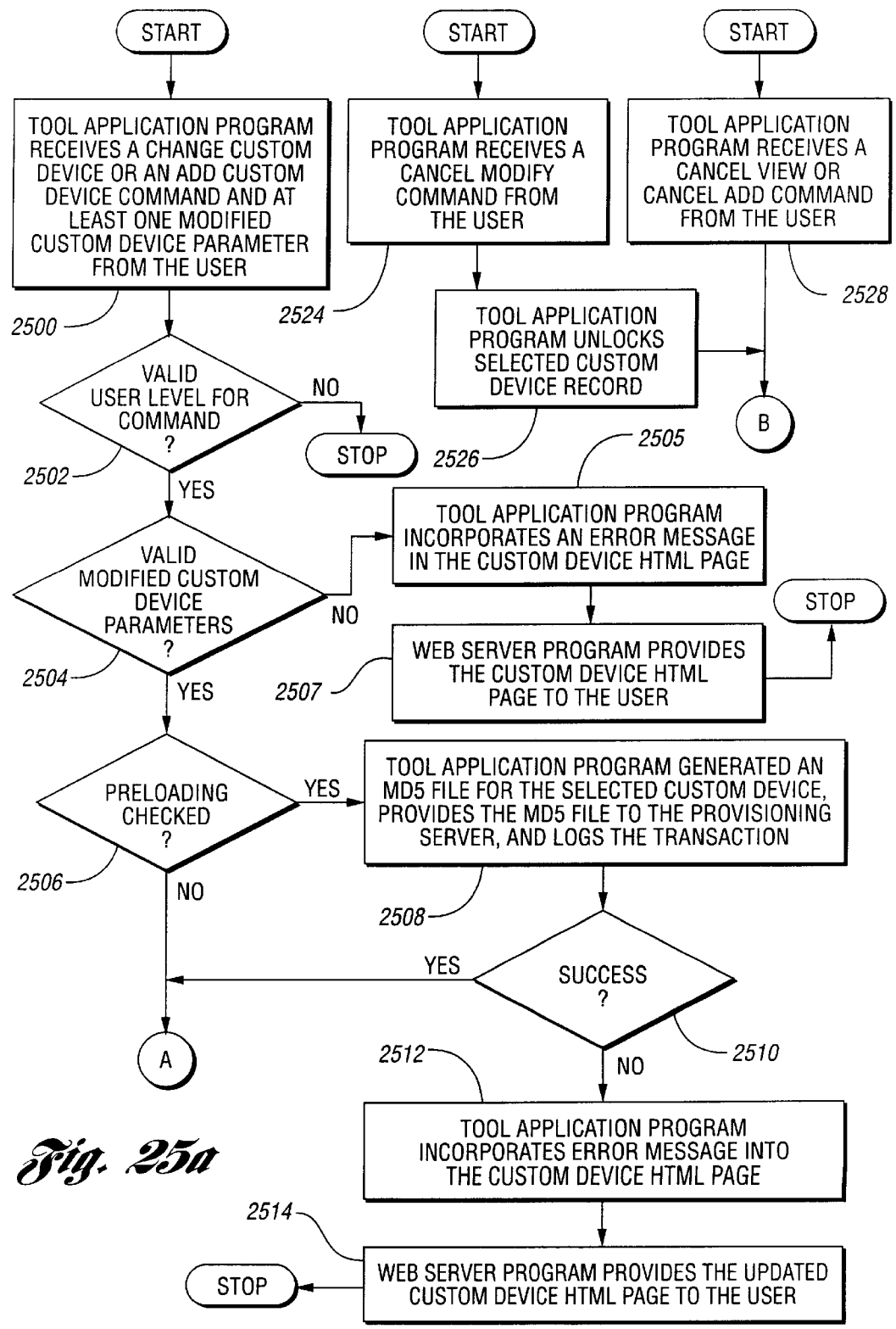
FIG. 25a–25b is a flow diagram of a process for changing custom device parameters.
Figure 25B:
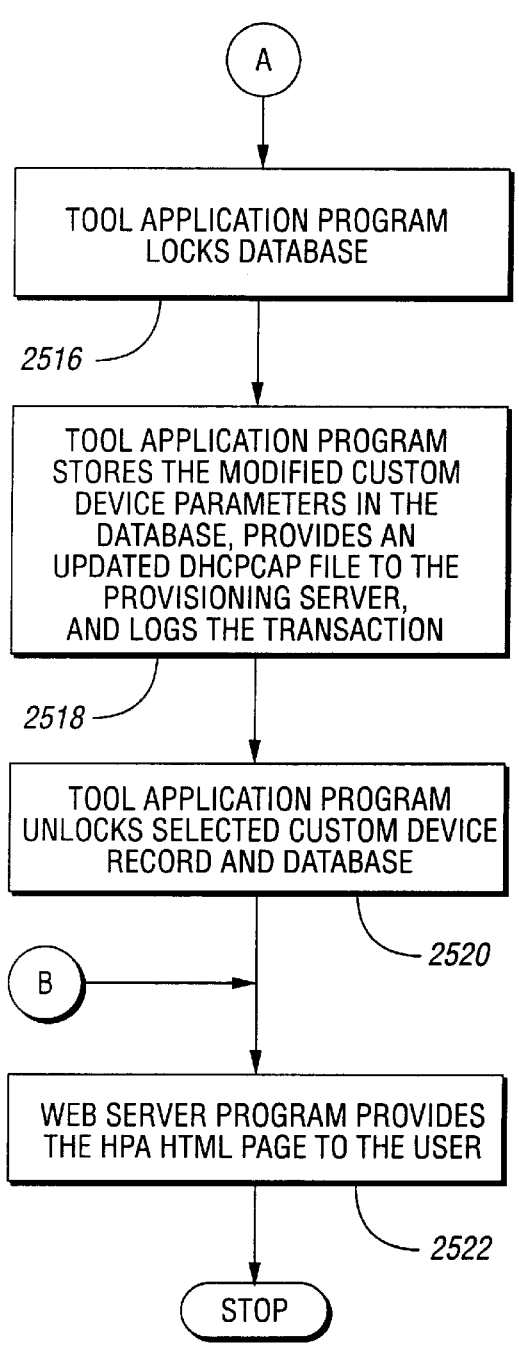

FIG. 25 is a flow diagram for entries 2408 and 2410 on custom device HTML page 2400. Tool application program 200 initiates saving additions and modification to the custom devices upon receipt of a change custom command from the user 208, as shown in block 2500. User level is validated in decision block 2502. Modified and added custom device parameters are validated in decision block 2504. Parameter validation includes checking that the static address exists within one of the networks, no duplication static IP addresses or hardware addresses, and restricted names cannot be used in the Unique Name field. If parameter validation fails, then an error message is returned to the user 208, as shown in blocks 2505 and 2507.

After successful parameter validation, tool application program 200 examines the "Lcw Mac Address Preloading" check box 2406, as shown in block 2506. If the box is checked, an MD5 file is generated for the selected custom device, the MD5 file is provided to the cable mode provisioning server program 218, and the event is logged, as shown in block 2508. The success of copying the MD5 file to the cable modem provisioning server 218 is determined in decision block 2510. If the attempt were unsuccessful, tool application program 200 inserts and error message into the custom device HTML page 2400, as shown in block 2512. Finally, web server program 206 provides the updated custom device HTML page 2400, with the error message, to user 208, as shown in block 2514.

If the check box 2410 is not checked, or the movement of the MD5 file to the cable modem provisioning server 218 was successful, then database 204 is locked, as shown in block 2516. Afterwards, the modified and added custom device parameters are stored in database 204, an updated dhcpcap file is provided to the cable modem provisioning server program 218, and the transaction is logged, as shown in block 2518. Database 204 and the selected custom device record are unlocked in block 2520. Finally, user 208 is returned to the HPA HTML page 500, as shown in block 2522.

Tool application program 200 initiates a cancellation of a modify custom device process when it receives a cancel modify command ("Cancel" entry 2410) from user 208, as shown in block 2524. The selected custom device record is unlocked in block 2526, and user 208 is returned to the HPA HTML page 500.

Cancellation of add custom device and view custom device processes are started when the tool application program 200 receives a cancel add and a cancel view command respectively. Web server program 200 then provides user 208 with the HPA HTML page 500, as shown in block 2522.

Figure 26:
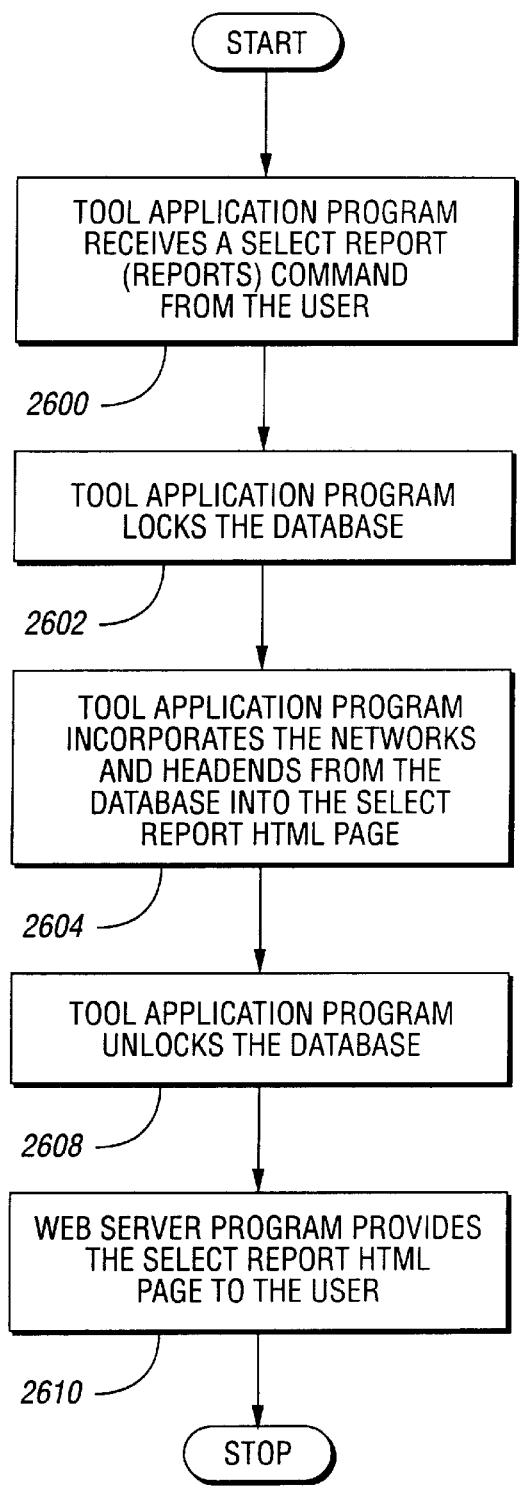
FIG. 26 is a flow diagram of a process for displaying the available report options.

FIG. 26 is a flow diagram for transitioning to a select report HTML page 2700. The process in initiated when the tool application program 200 recognizes that user 208 has selected the "Reports" entry 524 (HPA HTML page 500, FIG. 5), as shown in block 2600. Next, the database is locked, as shown in block 2602. Tool application program 200 incorporates the network IP addresses and headend names from database 204 into the select report HTML page 2700, as shown in block 2604. The database 204 is unlocked in block 2608. Finally, the web server program 206 provides the select reports HTML page 2700 to the user 208, as shown in block 2610.

Figure 27:
FIG. 27 is an example of a report option page display.

FIG. 27 is an example of the select reports HTML page 2700. This page allows the user 208 to select parameters that organize the report by headend node name 2702, by network base IP address 2704, or by all 2706 of the networks in the database 204. Selections are also provided for including 2708, excluding 2710, or exclusively 2712 showing the Net 10 networks in the report. (Net 10 networks are non-routable private class A networks used by the cable MSO operators.)

FIG. 28 is a flow diagram for the process of generating a report. The process starts when the tool application program 200 receives a report command ("Reports" entry 2714) and the selected report parameters from user 208, as shown in block 2800. Database 204 is locked in block 2802. Tool application program 200 reads the requested information from the database 204 and generates an appropriately formatted report, as shown in block 284. When tool application program 200 is finished reading the database 200, the database 200 is unlocked, as shown in block 2807. Finally, the web server program 206 provides the report to the user 208, as shown in block 2810.

FIG. 29, FIG. 30 and FIG. 31 are examples of the report HTML pages for an All (summary) report 2900, a headend report 3000, and a network report 3100 respectively.

FIG. 32 is a flow diagram of a process for viewing the log file 228. Tool application program 200 initiates the process when it receives a log command ("Logs" entry 522 in HPA HTML page 500, FIG. 5), as shown in block 3200. Next, tool application program 200 incorporates at a maximum the fifty latest transactions from the log file 228 into a log HTML page 3300, as shown in block 3202. Finally, web server program 206 provides the log HTML page 3300 to user 208.

FIG. 33 is an example of a log HTML page 3300 showing the only five transactions in log file 228.

Another element of the present invention mentioned briefly in FIG. 2 is the menu file 222. This file is a collection of several files (not shown in FIG. 2) used in the various HTML pages. The following files contain simple lists: city (city names), loopdelay (delay times), node (headend node numbers), rxfreq (receive RF frequency), txfreq (transmit RF frequency), and state (two letter state abbreviations). Formats for more complicated files within Menu Files 222 are provided in Table 1 to Table 3. The format of the User.db file 224 is provided in Table 4.

TABLE 1

Boot file (Service Group)

| Field | Functionality |
|---|---|
| sid | Key field for each service group identification |
| sname | Name of the service group parameter |
| dsbw | Downstream data rate in bits per second |
| usbw | Upstream data rate in bits per second |
| apriority | Access priority:<br>1 = high, 2 = normal, 3 = low |
| btraffic | Number of overflow packet opportunities allowed:<br>0 = 1 pkt, 1 = 21 pkts, 2 = 43 pkts, 3 = 65 pkts, 4 = 87 pkts |
| hrn | Is this a headend reference node?:<br>Yes = headend reference node<br>No = not a headend reference node |
| mens | Maximum Ethernet nodes supported |
| ftype | Type of cable modem file intended:<br>LANCity, DOCSIS, both |
| filter | Filter Type:<br>IP, IP/SP, IP/DHCP, IP/DHCP/NetBEUI |
| nwaccess | Network access on/off flag. Allows/denies PC's access to network |
| swfilename | Name of file to auto-upgrade software (if any) |

TABLE 2

Headend file

| Field | Functionality |
|---|---|
| headend name | Name of headend |
| hostname | Name of machine hosting the headend |
| ip address | IP address of the host machine |

TABLE 3

Use file

| Field | Functionality |
|---|---|
| id | identification tag |
| text | text describing use type |

TABLE 4

User.db file

| Field | Functionality |
|---|---|
| username | Name of user |
| password | User's password |
| userlevel | Authorized level of access to the tool commands |

Configuration file 202 provides the tool application program 200, and any other application running on the host computer 100a with global information about the provisioning system currently in use. When one or more of the global parameters require modification, it can be accomplished at the configuration file 202 without having to modify the code of the tool application program 200 and all of the other web applications. Note that adding to the configuration file 202 does not automatically propagate the new values to remote machines. Merely adding Network Information Service names (a Sun Microsystems application that provides information to all machines in a network) and IP addresses of the remote servers to the configuration file does not enable the remote procedure calls this file defines. Any remote machines defined in the configuration file 202 must also be configured to allow the user running the web server program 206 to access its resources and execute certain programs. Examples of the types of information that may be found in the configuration file 202 are provided in table 5 through table 12.

TABLE 5

Remote Machine Interface Names

| Variable | Description | Suggested Values | Restrictions |
|---|---|---|---|
| $bootpip | IP address of BOOTP server | x.x.x.x | |
| $bootpserver | NIS name of BOOTP server | bootp | no spaces or "." |
| $bootptype | BOOTP server type | join* | no spaces |
| $bootpversion | BOOTP version | x | integer |
| $dhcpip | IP address of DHCP server | x.x.x.x | |
| $dhcpserver | NIS name of DHCP server | dhcp | no spaces or "." |
| $dhcptype | DHCP server type | join* | |
| $dhcpversion | DHCP version | x | integer |
| $use_dns_file | Turns on/off use of dns file | x | 0 = off, 1 = on |
| $dnsip | DNS IP address | x.x.x.x | |
| $dnssever | DNS server name | dnsname | no spaces or "." |
| $tftppip | TFTP server IP address | x.x.x.x | |
| $tftpname | TFTP server name | tftpname | no spaces or "." |
| $tftptype | TFTP server type | solaris | no spaces |
| $tftpversion | TFTP version | x | integer |
| $secure_tftp | TFTP secure | x | 0 = on, 1 = off |
| $routable_hrns | Gateway of 24 Net for headend reference nodes (else 10 Net) | x | 0 = no, 1 = yes |
| $tftphome | TFTP home directory | /tftproot | |
| $todserver | Time of Day server | todname | no spaces or "." |
| $todip | IP address of TOD server | x.x.x.x | |

*"join" is a server supplied by Join System's, Inc.

TABLE 6

Global CGI Definitions

| Variable | Description | Suggested Values | Restrictions |
|---|---|---|---|
| $defaultdomain | Domain for region | <region>\.meadiaone\.net | two letter designation |
| $webmaster | Primary web support person | <name>\@mediaone\.net | no spaces or "." |
| $backdoor | Password override | at least 8 characters | don't use special characters |
| $upgradepassword | Upgrade password | at least 8 characters | don't use special characters |
| $provisioning password | Register/De-register password | at least 8 characters | don't use special characters |

TABLE 6-continued

Global CGI Definitions

| Variable | Description | Suggested Values | Restrictions |
|---|---|---|---|
| $usefile | Use files instead of rsh'ing to provision server | yes | yes/no |
| $reset_nodes | Enable reset of headend reference node | x | 0 = no, 1 = yes |
| $additional_messages | Additional message to display on search page | string | |
| $dns_flag | Require "-" in gw dns | x | 0 = ignore, 1 = require |
| $status_flag | Enables logging of search hits in status.log | 1 | |

TABLE 7

SNMP Community Strings

| Variable | Description | Suggested Value | Restrictions |
|---|---|---|---|
| $lcpread | Read string for dynamics | public | escape control characters and use all lower case |
| $lcpwrite | Write string for dynamics | secrete | Same as above |
| $lchread | Reads string for statics | secrete | Same as above |
| $lchwrite | Write string for statics | secrete | Same as above but unique to all |
| $lcptrap | Trap string for dynamics | "none" | |
| $lchtrap | Trap string for statics | "none" | |

TABLE 8

Miscellaneous

| Variable | Description | Suggested Values | Restrictions |
|---|---|---|---|
| $testswitch | Turn off/on remote procedure calls respectively | x | on/off |
| $prohibit_owner_data | Limits viewing of owner data | z.z.x.x | "x" is a wildcard |
| $cmts_version | Cable modem termination system software version | x.xx | |
| $cm_version | Cable modem software version | x.xx | |
| $sm_sw_dir | Location of software updates | /sw | |
| $xmit_max | Max normal transmit level | xx | |
| $xmit_min | Min normal transmit level | xx | |
| $xrcv_max | Max normal receive level | xx | |
| $xrcv_min | Min normal receive level | xx | |
| $pktloss_max | Max acceptable packet loss | x.xx | |

TABLE 9

Data Path Definitions

| Variable | Description | Suggested Values | Restrictions |
|---|---|---|---|
| $webpath | web server's home directory | /web | use symbolic link if other than/web |
| $optjoin | Command directory | /opt/join* (default) | none |
| $etcjoin | Configuration directory | /etc/join* (default) | none |
| $binjoin | Script directory | /opt/join/bin* | none |
| $webjoin | Web scripts directory | /opt/join/bin/webscripts* | owned by users "nobody" |
| $traceroute | Traceroute path | /opt/VJtr/bin/tracetroue | |
| $commonpath | Common path | /$webpath/userdb/Common | |
| $tfphome | TFTP home directory | /usr/tftp (default) | none |
| $hpapath | HPA script home on web server | /web/userb/Provisioning | no exceptions |
| $md5spath | MD5 scripts directory | /web/userdb/Provisioning/md5s | no exceptions |
| $snmppath | SNMP commands directory | /usr/local/bin (default) | none |
| $toolspath | HSDTOOLS directory | /web/userdb/hsdtools | no exceptions |
| $web1 | $1^{st}$ copy of dhcpcap | $etcjoin/dhcpcap.web1* | generated file |
| $web2 | $2^{nd}$ copy of dhcpcap | $etcjoin/dhcpcap.web2* | generated file |
| $dnsfile | DNS for HE nodes | $etcjoin/henodes.dns* | generated file |
| $netmasks | Netmasks file for Join | $etcjoin/netmasks.suggested* | generated file |

*"join" is a server supplied by Join Systems, Inc.

TABLE 10

Data Locations

| Variable | Description | Suggested Values | Restrictions |
|---|---|---|---|
| $customers | Remedy/Stage data file | $toolspath/hsd-dns | transferred nightly from Remedy/Stage |
| $dnsnames | Remedy/Stage hostname | $toolspath/dnsname.dat | transferred nightly from Remedy/Stage |
| $healthpath | Directory for stored SNMP info for modems | $hsdtools/healthdata | none |
| $ownerpath | Directory for stored owner info for cable modems/PC's | $hsdtools/ownerdata | none |
| $serverpath | Directory for stored server info for cable modems/PCs | $hsdtools/serverdata | none |
| $hpa_display_switch location | Display by city of physical | city | |
| $bootpcap | BOOTP server specific dhcpcap file | $hpapath/bootpcap | generated file |
| $bootfile | Service group definitions (web dropdown list) | $hpapth/bootfile | see file bootpfile.format |

TABLE 10-continued

Data Locations

| Variable | Description | Suggested Values | Restrictions |
|---|---|---|---|
| $bootpnetmasks | Netmasks for BOOTP server | $hpapth/ netmasks.bootp | generated file |
| $cityfile | Listing of possible cities (web dropdown list) | $hpapath/city | 1 per line |
| $dhcpcap | DHCP server specific dhcpcap file | $hpapath/ dhcpcap | generated file |
| dhcpnetmasks | Netmasks for DHCP server | $hpapath/ netmasks.dhcp | generated file |
| $frequency | Not Currently Used | $hpapath/freq | 1 per line |
| $headendfile | Listing of all headends (web dropdown list) | $hpapath/ headend | 1 per line |
| $henodes | Flat file database of HPA | $hpapath/ dhcpcap.dat | generated file |
| $henodesdns | Listing of DNS entries for headend nodes | $hpapath/ henodes.dns | generated file |
| $newcap | Temp file for DNS entries | $hpapath/ newcap | generated file |
| $nodefile | Listing of possible nodes (web dropdown list) | $hpapath/node | 1 per line |
| $statefile | Listing of possible states | $hpapath/state | 1 per line |

TABLE 11

Local Processes

| Variable | Description | Suggested Values | Restrictions |
|---|---|---|---|
| $datecommand | Obtain date from server | /usr/bin/date | none |
| $pingcommand | Execute Ping command | /usr/sbin/ping | none |

TABLE 12

Remote Processes

| Variable | Description | Suggested Values | Restrictions |
|---|---|---|---|
| $exec_dhcp | Executive program DHCP server | rsh $dhcpserver | " " if application is on co-hosted with web server |
| $exec_bootp | Executive program on BOOTP server | rsh $bootpserver | " " if application is on co-hosted with web server |
| $datecommandr | Time/Date of DHCP server | rsh $dhcpserver /usr/bin/date | remove rsh portion for web server co-hosted with dhcpserver |
| $jdbdump-command | Database dump of DHCP server-readable | rsh $dhcpserver $optjoin/ jdbdump - a* | same as above |
| $jdbdump-command2 | Database dump of BOOTP server - readable | rsh $bootpserver $optjoin/ jdbdump - a* | same as above |

TABLE 12-continued

Remote Processes

| Variable | Description | Suggested Values | Restrictions |
|---|---|---|---|
| $jdbdumpx-command | Database dump of DHCP server | rsh $dhcpserver $optjoin/ jdbdump - a* | same as above |
| $jdbdumpx-command2 | Database dump of BOOTP server | rsh $bootpserver $optjoin/ jdbdump - a* | same as above |
| $jdbregcommand | Dump register of DHCP server | rsh $dhcpserver $optjoin jdbreg.keep- s* | same as above (jdbreg.keep is a copy of jdbreg with Set UID) |
| $jdbreg-command2 | Dump register of BOOTP server | rsh $bootpserver $optjoin/ jdbreg - s* | same as above (jdbreg has UID set) |
| $lasttransaction | Parse DHCP server log by device | rsh $dhcpserver $binjoin/ lasttrans* | |
| $lasttransaction2 | Parse BOOTP server log by device | rsh $bootpserver $binjoin/ lasttrans | |
| $jdbrega | Add a MAC address to the DHCP server | rsh $dhcpserver $webjoin/ jdbrega.csh* | $jdbrega <MAC> |
| $jdbrega2 | Add a MAC address to the BOOTP server | rsh $bootpserver $webjoin/ jdbrega.csh* | $jdbrega <MAC> |
| $jdbregd | Remove a MAC address from the DHCP server | rsh $dhcpserver $webjoin. jdreg.csh* | $jdbregd <MAC> |
| $jdbregd2 | Remove a MAC address from the BOOTP server | rsh $bootpserver $webjoin. jdregd.csh* | $jdbregd <MAC> |
| $jdbregda | Remove and Add a MAC address from the DHCP server | rsh $dhcpserver $webjoin. jdregda.csh* | $jdbregda <MAC> <MAC> |
| $jdbregda2 | Remove and Add a MAC address from the BOOTP server | rsh $bootpserver $webjoin. jdregda.csh* | $jdbregda <MAC> <MAC> |
| $jdbregr | Re-register a MAC address to the DHCP server | rsh $dhcpserver $webjoin/ jdbregr.csh* | $jdbregr <MAC> |
| $jdbregr2 | Re-register a MAC address to the BOOTP server | rsh $bootpserver $webjoin/ jdbregr.csh* | $jdbregr <MAC> |
| $jdbregs | List MAC address(es) to the DHCP server | rsh $dhcpserver $webjoin/ jdbregs.csh* | $jdbregs |
| $jdbregs2 | List MAC address(es) to the BOOTP server | rsh $bootpserver $webjoin/ jdbregs.csh* | $jdbregs |

*"join" is a server provided by Join System, Inc.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus to provide a user with an interface to a provisioning system having at least one provisioning server, the apparatus comprising:
    a database providing for at least one record;
    a tool application program in communication with the database and the at least one provisioning server; and
    a server program providing a set of protocols to facilitate communications between the tool application program and the user, wherein the tool application program is operative in response to commands received from the user to add a new record to the at least one record, delete a selected record of the at least one record, modify the selected record of the at least one record, and communicate the additions, deletions and modifications to the at least one provisioning server.

2. The apparatus of claim 1 wherein the at least one record includes at least one policy record having a state name, a city name, a headend name, a policy number, an alias name zone, at least one alias name server address, a lease time, a rebind time and a renewal time.

3. The apparatus of claim 1 wherein the at least one record includes at least one network record each network having a headend name, a use selection, a primary network base address, a subnet mask, and at least one gateway address.

4. The apparatus of claim 3 wherein the at least one network record further includes a link to a selected policy record of the at least one record, at least one secondary network base address, and at least one network dynamic address range.

5. The apparatus of claim 4 wherein the at least one network record further includes a service group, a transmit frequency, a receive frequency, and a loop delay, and
wherein upon receipt of a generate bootstrap file command and a selected network record of the at least one network record from the user, the tool application program is operative to generate a bootstrap file and provide the bootstrap file to the at least one provisioning server.

6. The apparatus of claim 1 wherein the at least one record includes at least one address record having has a state name, a city name, a static Internet Protocol address and a unique name.

7. The apparatus of claim 6 wherein the at least one address record further includes an alias name, and
wherein upon receipt of a generate alias name command and a selected address record of the at least one address record from the user, the tool application program is operative to generate the alias name, and provide the alias name to the at least one provisioning server.

8. The apparatus of claim 1 further comprising at least one service group record stored in the database, and
wherein the tool application program is operative in response to commands from the user to modify a selected service group record of the at least one service group record, and communicate the modifications to the at least one provisioning server.

9. The apparatus of claim 8 wherein each service group record of the at least one service group record has a downstream bandwidth, an upstream bandwidth, an access priority, an burst traffic rate, a headend reference node flag, a number of local network nodes supported, a modem file type name and a filter setting.

10. The apparatus of claim 8 wherein the at least one record includes at least one headend node record having a state name, a city name, a headend name, a node number, a medium access control address, an Internet Protocol address and a link to a selected service group of the at least one service group.

11. The apparatus of claim 10 wherein the at least one headend node record further includes an alias name, and
wherein upon receipt of a generate alias name command and a selected headend node record of the at least one headend node record from the user, the tool application program is operative to generate the alias name and communicate the alias name to the at least one provisioning server.

12. The apparatus of claim 8 wherein the at least one record includes at least one custom device record having a state name, a city name, a headend name, a node number, a medium access control address, a unique name and a link to a selected service group of the at least one service group.

13. The apparatus of claim 12 wherein the at least one custom device record further includes a static Internet Protocol address.

14. The apparatus of claim 13 wherein the at least one custom device record further includes a network base address and at least one authorized medium access control address.

15. The apparatus of claim 8 wherein the tool application program is operative to validate each added record to the at least one record, modifications to each record of the at least one record, and modifications to each service group record of the at least one service group record received from the user against the database.

16. The apparatus of claim 1 wherein upon receipt of a report command and at least one report parameter from the user, the tool application program is operative to provide the user with a report display page generated from the database in accordance with the at least one report parameter.

17. The apparatus of claim 16 wherein a first report parameter of the at least one report parameter is selected from groups of parameters consisting of headend names, primary network base addresses, and headend names plus primary network base addresses.

18. The apparatus of claim 16 wherein a second report parameter of the at least one report parameter is selected from a group of parameters consisting of excluding secondary networks, including secondary networks, and showing only secondary networks.

19. The apparatus of claim 1 further comprising:
a log file accessible to the tool application program for recording a plurality of transactions of the tool application program, and
wherein upon receipt of a log command from the user, the tool application program is operative to read a predetermined number of most recent transactions of the plurality of transactions from the log file and provide the user with a log display page containing the predetermined number of most recent transactions of the plurality of transactions.

20. The apparatus of claim 1 further comprising a lock file accessible to the tool application program and having a master lock for preventing simultaneous changes to the database.

21. The apparatus of claim 20 wherein the lock file further includes a record lock for each record in the database for preventing simultaneous modifications and deletions to each record.

22. The apparatus of claim 1 further comprising a user level file accessible to the tool application program and linking a plurality of user names to a plurality of passwords and a plurality of user levels,
wherein the tool application program receives an entered user name and an entered password from the user, and validates the entered user name and the entered password against the plurality of user names and the plurality of passwords to determine a respective user level of the plurality of user levels, and
wherein after successful validation of the entered user name the entered password, the tool application program is operative to validate each command received from the user against the respective user level.

23. The apparatus of claim 1 further comprising a browser program having one interface to the network and another interface to the user to facilitate communications between the user and the server program.

24. The apparatus of claim 1 further comprising a shell script program between the tool application program and the server program to facilitate communications between the tool application program and the server program.

25. The apparatus of claim 1 further comprising an application program interface program between the tool application program and the at least one provisioning server to facilitate communications between the tool application program and the at least one provisioning server.

26. A method to provide a user with an interface to a provisioning system having at least one provisioning server, the method comprising:

storing at least one record;

adding a new record to the at least one record in response to receiving a change command and the new record from the user;

deleting a selected record of the at least one record in response to receiving a delete command from the user;

modifying the selected record of the at least one record in response to receiving the change command and modifications to the selected record of the at least one record from the user; and communicating additions, deletions and modifications to each record of the at least one record to the at least one provisioning server in response to the additions, deletions and modifications.

27. The method of claim 26 wherein the at least one record includes at least one network record, the method further comprising:

generating a bootstrap file based upon a selected network record of the at least one network record in response to receiving a generate bootstrap file command from the user; and communicating the bootstrap file to the at least one provisioning server upon completing the bootstrap file generation.

28. The method of claim 26 wherein the at least one record includes at least one address record, the method further comprising:

generating an alias name based upon a selected address record of the at least one address record in response to receiving a generate alias name command from the user; and providing the alias name to the at least one provisioning server in response to generating the alias name.

29. The method of claim 26 wherein the at least one record includes at least one headend node record, the method further comprising:

generating an alias name based upon a selected headend node record of the at least one headend node record in response to receiving a generate alias name command from the user; and providing the alias name to the at least one provisioning server in response to generating the alias name.

30. The method of claim 26 further comprising:

storing at least one service group record;

modifying a selected service group record of the at least one service group record in response to receiving the change service group command and modifications to the selected service group record of the at least one service group record from the user; and communicating modifications to the selected service group record to the at least one provisioning server in response to receiving the modifications to the selected service group of the at least one service group.

31. The method of claim 30 further comprising validating each added record to the at least one record, each modified service group record of the at least one service group record, and each modified record of the at least one record in response to receiving each added record to the at least on record, each modified service group record of the at least one service group record, and each modified record of the at least one record from the user.

32. The method of claim 26 further comprising:

generating a report based upon a report parameter in response to receiving a report command and the report parameter from the user; and communicating the report to the user in response to completing the report generation.

33. The method of claim 26 further comprising:

recording a plurality of transactions initiated by the user;

creating a log display page containing a predetermined number of transactions of the plurality of transactions in response to receiving a log command from the user; and communicating the log display page to the user in response to completing the log display page creation.

34. The method of claim 26 further comprising:

setting a master lock prior to storing, adding, deleting, modifying and generating; and releasing the master lock in response to completing storing, adding, deleting, modifying and generating.

35. The method of claim 34 further comprising:

setting a respective record lock prior to deleting, and modifying each record of the at least one record; and releasing the respective record lock in response to completing the deleting and modifying.

36. The method of claim 26 further comprising:

linking a plurality of user names to a plurality of passwords and a plurality of user levels;

validating an entered user name and an entered password against the plurality of user names and the plurality of passwords to determine a respective user level of the plurality of user levels in response to receiving the entered user name and the entered password from the user; and validating each command received from the user against the respective user level in response to successfully validating the entered user name and the entered user password.

* * * * *